(12) United States Patent
Hiroi et al.

(10) Patent No.: US 6,347,150 B1
(45) Date of Patent: *Feb. 12, 2002

(54) METHOD AND SYSTEM FOR INSPECTING A PATTERN

(75) Inventors: Takashi Hiroi; Maki Tanaka; Masahiro Watanabe, all of Yokohama; Asahiro Kuni, Tokyo; Hiroyuki Shinada, Chofu; Mari Nozoe, Ome; Aritoshi Sugimoto, Tokyo; Chie Shishido, Yokohama, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/932,193

(22) Filed: Sep. 17, 1997

(30) Foreign Application Priority Data

Sep. 17, 1996 (JP) .............................. 8-245161

(51) Int. Cl.[7] ................................. G06K 9/64
(52) U.S. Cl. .................. 382/149; 382/148; 250/559.39; 250/559.45
(58) Field of Search ................................ 382/144, 145, 382/148–149, 312; 348/87, 126; 356/237.4, 237.5; 250/559.4, 559.5, 559.6, 559.39, 559.45, 311; 364/468.17, 468.28; 702/82, 40, 159; 48/7, 16

(56) References Cited

U.S. PATENT DOCUMENTS

| | | | | |
|---|---|---|---|---|
| 4,532,650 A | * | 7/1985 | Wihl et al. ................... | 382/144 |
| 4,587,617 A | * | 5/1986 | Barker et al. ................ | 382/149 |
| 4,628,531 A | * | 12/1986 | Okamoto et al. ........... | 382/144 |
| 4,771,468 A | * | 9/1988 | Batchelder et al. ......... | 382/149 |
| 4,845,558 A | * | 7/1989 | Tsai et al. .................... | 358/106 |
| 4,860,371 A | * | 8/1989 | Matsuyama et al. ........ | 382/149 |
| 5,125,040 A | * | 6/1992 | Matsui et al. ................ | 382/144 |
| 5,173,719 A | * | 12/1992 | Taniguchi et al. ........... | 356/394 |
| 5,502,306 A | * | 3/1996 | Meisburger et al. ........ | 250/310 |
| 5,513,275 A | * | 4/1996 | Khalaj et al. ................ | 382/149 |
| 5,578,821 A | * | 11/1996 | Meisberger et al. ........ | 250/310 |
| 5,740,272 A | * | 4/1998 | Shimada ...................... | 382/149 |
| 5,880,531 A | * | 3/1999 | Hagiya et al. ............... | 257/786 |

FOREIGN PATENT DOCUMENTS

| | | |
|---|---|---|
| JP | A57196530 | 12/1982 |
| JP | A3232250 | 10/1991 |
| JP | A6294750 | 10/1994 |

* cited by examiner

Primary Examiner—Leo Boudreau
Assistant Examiner—Brian P. Werner
(74) Attorney, Agent, or Firm—Mattingly, Stanger & Malur

(57) ABSTRACT

The present invention relates to detection of defects with simple specification of the coordinates, in the inspection of an object having a plurality of patterns in which a portion having the two-dimensional repetition and portions having the repetition only in the X direction and in the Y direction are mixedly present. The cross comparison between a notice point and comparison points, for example, which are repetitive pitches away from the notice point, is carried out, and only the portion having the difference which can be found out with any of the comparison points is extracted as a defect candidate, which results in that the portion having the two-dimensional repetition as well as the portion having the repetition only in the X direction or in the Y direction can be inspected. As a result, while the portion, such as an isolated point, having no repetition both in the X direction and in the Y direction is extracted as the defect candidate, the defect candidate is not treated as the defect in the case where the defect candidate of interest occurs regularly in a plurality of objects to be inspected, so that such a defect candidate is excluded to extract only a true defect.

17 Claims, 11 Drawing Sheets

3 MEMORY MAT PORTION
4 X DIRECTION DIRECT PERIPHERAL CIRCUIT
Y DIRECTION DIRECT PERIPHERAL CIRCUIT 5
4 X DIRECTION DIRECT PERIPHERAL CIRCUIT

102a COMPARISON POINT
101 NOTICE POINT
102c COMPARISON POINT
102b COMPARISON POINT
102d COMPARISON POINT

METHOD AND SYSTEM FOR INSPECTING A PATTERN

BACKGROUND OF THE INVENTION

The present invention relates to a pattern inspecting method and a system for use in such a method in which an image or a waveform representing the physical properties of an object such as a semiconductor wafer or the like is obtained by utilizing light, an electron beam or the like, and the image or the waveform is compared with the design information or the resultant image, thereby inspecting a pattern, and a semiconductor wafer manufacturing method employing the same.

As for the conventional method of inspecting a pattern, as described in JP-A-6-294750, there is well known a first method wherein by utilizing the property in which it can be expected that the chips adjacent to one another have the same pattern, a pattern of one chip is compared with that of the chip adjacent thereto, and if there is any difference therebetween, then it is judged that the pattern of any one of the chips has a defect. In addition, as described in JP-A-57-196530, there is well known a second method wherein by utilizing the property in which it can be expected that memory cells within a chip have the same pattern, a pattern of one memory cell is compared with that of the memory cell adjacent thereto, and if there is any difference therebetween, then it is judged that the pattern of any one of the memory cells has a defect.

Further, as described in JP-A-3-232250, there is well known a third method wherein a storage unit for storing therein, on the basis of the pattern arrangement information within a chip, with respect to the scanning direction of a one-dimensional sensor and the storage scanning direction from the starting point of the chip, the data of a chip comparison inspection area and a repeated pattern (a pattern of a memory cell) comparison inspection area is included, and with consideration of both the sensor scanning position and the stage inspection position, it is controlled whether or not the defect output of the chip comparison inspection and the defect output of the repeated pattern comparison inspection can be outputted.

In the conventional first method, two kinds of errors are mixed since the chips have the different patterns as the objects of comparison, and even in the case of the normal portion, the difference occurs so that the identification of the defect of interest to the fine defect becomes difficult. The first error is due to the object. Then, the exposure conditions are different between the different chips because the aligner cannot expose the overall surface of the wafer at the same time, or in the CVD system or the like, the overall surface of the wafer can be processed at the same time, but if the comparison distance is long, then the different thicknesses are obtained in the periphery of the wafer especially so that the different patterns are formed. The second error is due to the inspection system. Then, while the patterns are detected and compared with one another after a predetermined lapse of time because it is difficult to detect a large area at the same time, if the time interval is long, then the detection and comparison are readily to be affected by system drift, vibration and the like. Therefore, in order to ensure the reliability, the system construction will be complicated to increase the cost.

In the conventional second or third method, the pattern of the object to be compared is necessarily present. In other words, the inspection area is limited on the division line between the memories having the comparison direction matching that of the inside of the memory mat portion in which the memory cells are regularly arranged, and also the specification of the area needs to be strictly carried out. In particular, in the recent pattern layout in which the inside of the memory mat is finely divided, the inspection areas need to be set in only the inside of the areas which are obtained by the division. As a result, it will be expected that the area setting takes a lot of time and hence the inspection possible area is limited.

SUMMARY OF THE INVENTION

The present invention was made in order to solve the foregoing problems associated with the prior art, and it is an object of the present invention to provide a pattern inspecting method which is capable of inspecting all the areas of portions, which are formed by small scale repetition, on an object to be inspected, such as a semiconductor wafer, with high reliability by the simple specification of the inspection area, and a system for use in such a method.

It is another object of the present invention to provide a method of manufacturing a semiconductor wafer by which, for a semiconductor wafer in which a repetitive pattern including both a memory mat portion and a direct peripheral circuit is formed, a defect can be inspected with high reliability to enable a high quality semiconductor wafer to be manufactured.

In order to attain the above-mentioned objects, according to the present invention, there is provided a pattern inspecting method wherein an object to be inspected, in which a plurality of same pattern groups are formed, is imaged to obtain two-dimensional digital image signals of the object to be inspected; the digital image signals, of the pattern of the pattern group to be inspected on the object to be inspected, out of the two-dimensional digital image signals are compared with the image signals of the patterns of the plurality of other pattern groups on the object to be inspected which should be essentially the same as the pattern of the pattern group to be inspected in order to extract a defect; and the information relating to the defect thus extracted is outputted to a communication line.

In addition, according to the present invention, there is provided a pattern inspecting method wherein an object to be inspected in which a plurality of identical pattern groups are formed at predetermined pitches is imaged to obtain image signals of the object to be inspected; the image signal, of the pattern of the pattern group to be inspected on the object to be inspected, out of the image signals is compared with the image signals of the other pattern groups on the object to be inspected which should be essentially the same as the pattern of the pattern group to be inspected in order to exclude any false defects to detect a true defect; and the information relating to the true defect thus detected is outputted.

In addition, according to the present invention, there is provided a method of inspecting a defect of a pattern wherein a semiconductor wafer in which a pattern including both a memory mat portion and a direct peripheral circuit is repeatedly formed at predetermined pitches is imaged; the image signal which has been obtained by the imaging is converted into digital image signals; the digital image signals corresponding to a notice point of the pattern to be inspected on the semiconductor wafer in the digital image signals which have been obtained by the conversion are compared with a plurality of digital image signals corresponding to th positions which are the predetermined pitches away from the notice point in order to extract defect candidates; false defects are extracted from the defect candidates thus extracted; any of the false defects is excluded from the defect candidates to detect a true defect; and the information relating to the true defect thus detected is outputted through communication means.

Further, according to the present invention, there is provided a method of inspecting a defect of a pattern wherein a semiconductor wafer in which a pattern including both a memory mat portion and a direct peripheral circuit is repeatedly formed at predetermined pitches is imaged; the image signal which has been obtained by the imaging is converted into digital image signals; the digital image signals corresponding to a notice point of the pattern to be inspected on the semiconductor wafer in the digital image signals which have been obtained by the conversion are compared with a plurality of digital image signals corresponding to a plurality of positions in the periphery of the notice point, thereby detecting any of defects which are present in the memory at portion and/or the direct peripheral circuit of the pattern to be inspected; and the information relating to the defects thus detected is outputted.

Further, according to the present invention, there is provided a pattern inspection system including: imaging means for imaging an object to be inspected; A/D conversion means for converting an image signal of the object to be inspected which has been imaged by the imaging means into digital image signals; defect candidate extracting means for comparing the digital image signals of a notice point on the object to be inspected in the digital image signals which have been obtained through the A/D conversion by the A/D conversion means with the digital image signals of comparison points, corresponding to the notice point, of a plurality of pattern which should be essentially the same as the pattern of the notice point in order to extract defect candidates of the notice point; defect detecting means for detecting a true defect from the defect candidates thus extracted; and output means for outputting therethrough the information relating to the true defect thus detracted.

Furthermore, according to the present invention, there is provided a pattern inspection system including: image signal detecting means for detecting the physical quantities of an object to be inspected, in which a repetitive pattern is formed, in the form of two-dimensional image signals; A/D conversion means for converting the two-dimensional image signals which have been detected by the image signal detecting means into two-dimensional image signals; difference image extracting means for comparing the digital image signals of a notice point in the two-dimensional digital image signals which have been obtained through the A/D conversion by the A/D conversion means with the digital image signals of a plurality of comparison points located at predetermined pitches which are integral multiples of the repetitive pitches in the X direction and in the Y direction in order to extract the image signals representing the differences (difference image signals) between the digital image signals of the notice point and the digital image signals of the plurality of comparison points; defect candidate extracting means for extracting defect candidates on the basis of the plurality of difference image signals which have been extracted by the difference image extracting means; and defect extracting means for extracting a true defect from the defect candidates which have been extracted by the defect candidate extracting means.

By adopting the detection method and the system construction as described above, for all the areas of the portions which are formed by the small scale repetition of the pattern, any defect can be inspected with high reliability by the simple area setting method.

In addition, by adopting the above-mentioned system construction, for all the areas of the portions which are formed by the small scale repetition of the pattern, any of defect can be inspected at high speed and with high reliability by the simple area setting method.

Further, by adopting the above-mentioned system construction, for the semiconductor wafer in which the repetitive pattern including both the memory mat portion and the direct peripheral circuit is formed, any defect can be inspected with high reliability and hence the high quality semiconductor wafer can be manufactured.

BRIEF DESCRIPTION OF THE DRAWINGS

The above and other objects as well as advantages of the present invention will become clear by the following description of the preferred embodiments of the present invention with reference to the accompanying drawings, wherein.

DESCRIPTION OF THE PREFERRED EMBODIMENTS

The preferred embodiments of the present invention will hereinafter be described in detail with reference to the accompanying drawings.

Figure 1B:
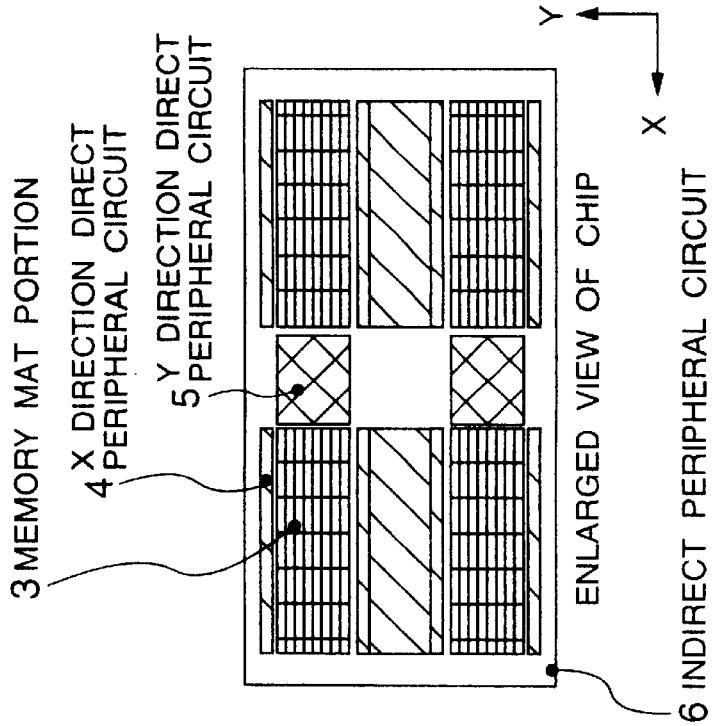
FIGS. 1a and 1b are schematic views showing the layout of a wafer from which a semiconductor memory is to be manufactured in accordance with the present invention, and chips arranged thereon.
Figure 1A:
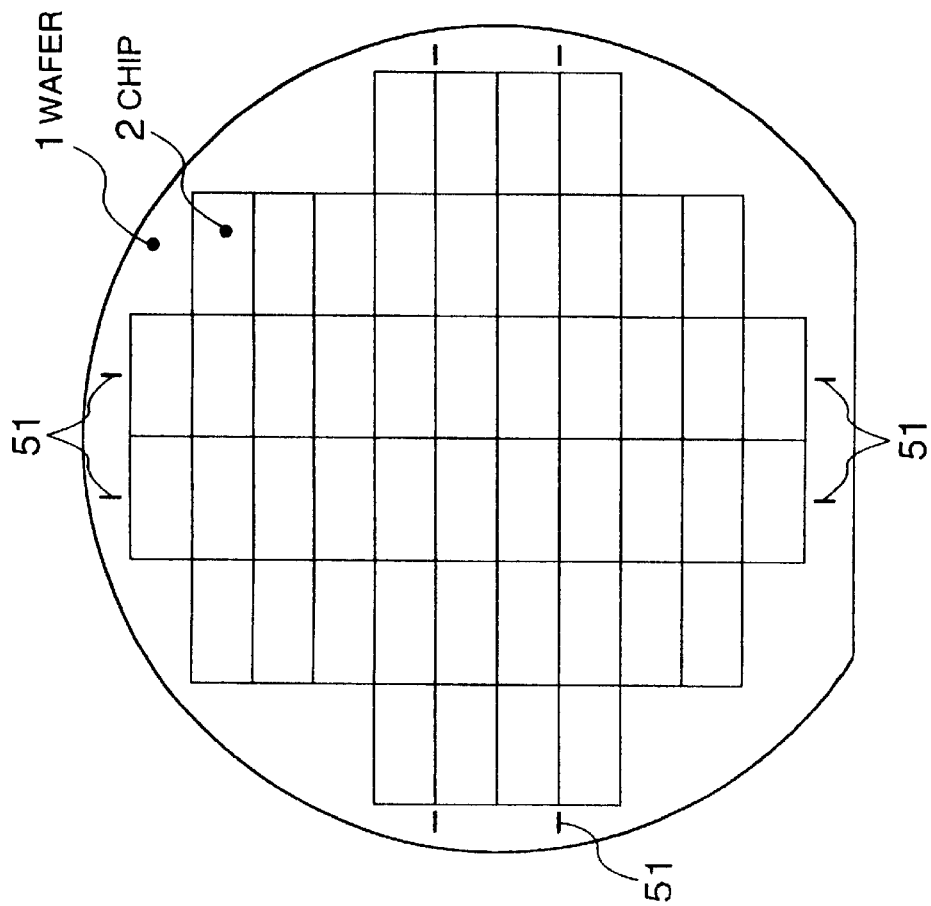

FIG. 1 shows a schematic view of the pattern layout of a semiconductor wafer in the middle of the manufacturing process in a semiconductor memory as an embodiment of an object to be inspected according to the present invention. A large number of chips 2 which will finally be the products identical to one another are arranged on a wafer 1. The pattern layout in the inside of the chips 2 includes, as shown in FIG. 1(b), an indirect peripheral circuit 6 having a very rough pattern, a memory mat portion 3 in which memory cells are two-dimensionally regularly arranged at repetitive pitches of Px in the X direction and at repetitive pitches of Py in the Y direction, and a direct peripheral circuit 4, 5, having a sense amplifier, an I/O circuit, a decoder circuit and the like, which has approximately the same pattern density as that of the memory mat portion and which is provided in the periphery of the memory mat portion. The memory mat portion 3 is further finely divided for every block (on the division line, the repetition is limited to one direction). The direct peripheral circuit consists of a portion (Y direction direct peripheral circuit) in which the repetition, which is present in the X direction of the memory mat portion, is provided only in the Y direction and the repetitive pitch is n*Py which is integral multiples of the repetitive pitch Py of the memory cells, and a portion (X direction direct peripheral circuit) 4 in which the repetition, which is present in the Y direction of the memory mat portion, is provided only in the X direction and the repetitive pitch is m*Px which is integral multiples of the repetitive pitch Px of the memory cells.

In addition, the memory mat portions 3 and the direct peripheral circuits 4, 5 are subjected to grouping every 32 to 128 lines. Then, out of them, since the pattern is formed with a minimum line width of equal to or smaller than 0.3 μm, the size of the fatal defect is small, and the area in which any of the fine defects should be detected with high sensitivity is the memory mat portion 3 and the direct peripheral circuit 4, 5. Since the indirect peripheral circuit of the area other than the area of the memory mat portion 3 and the direct peripheral circuit 4, 5 has the thick line width, the size of the fatal defect is large and hence the defect does not need to be necessarily detected with maximum sensitivity.

Figure 2:
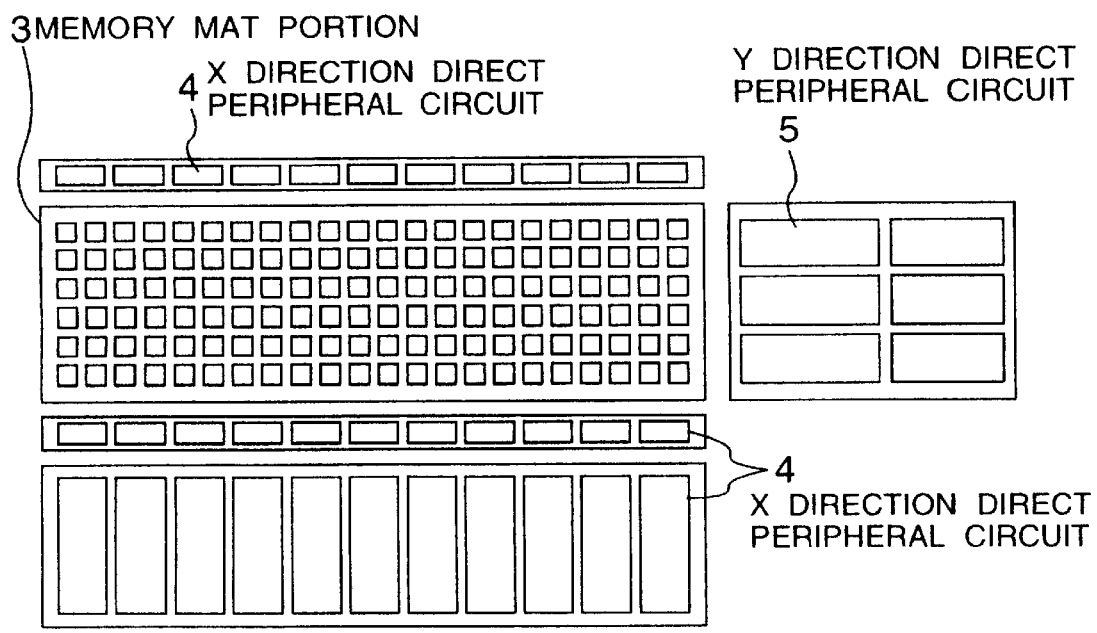
FIG. 2 is a schematic view showing the layout of a memory mat portion and a direct peripheral circuit in accordance with the present invention.
Figure 3:
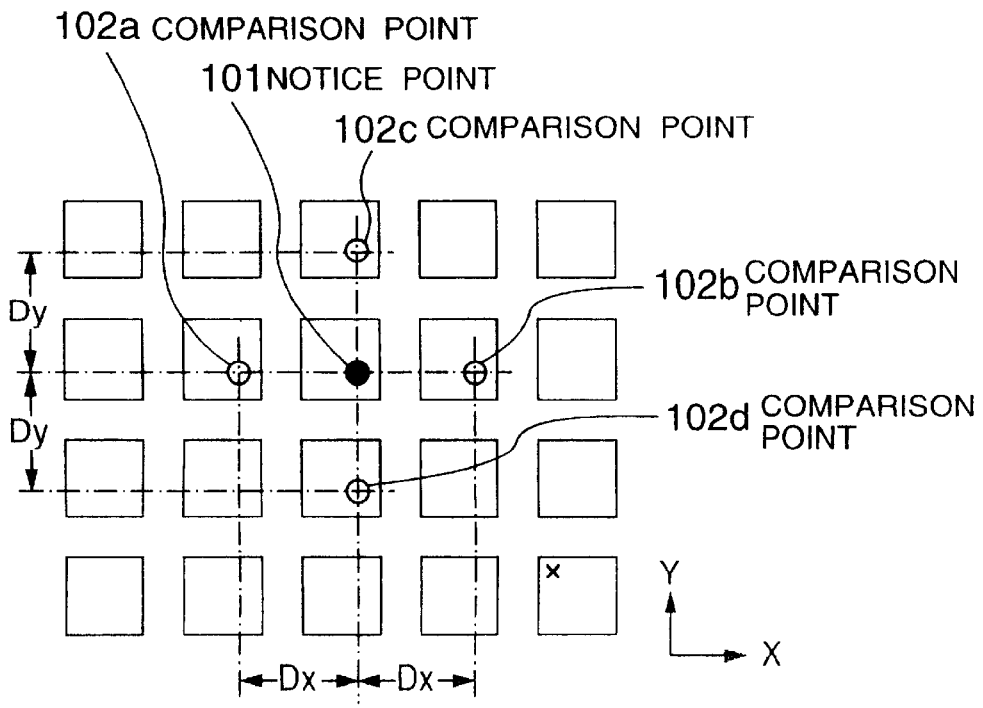
FIG. 3 is a schematic view useful in explaining comparison and inspection of the inside of a two-dimensional repetitive pattern in accordance with the present invention.
Figure 6:
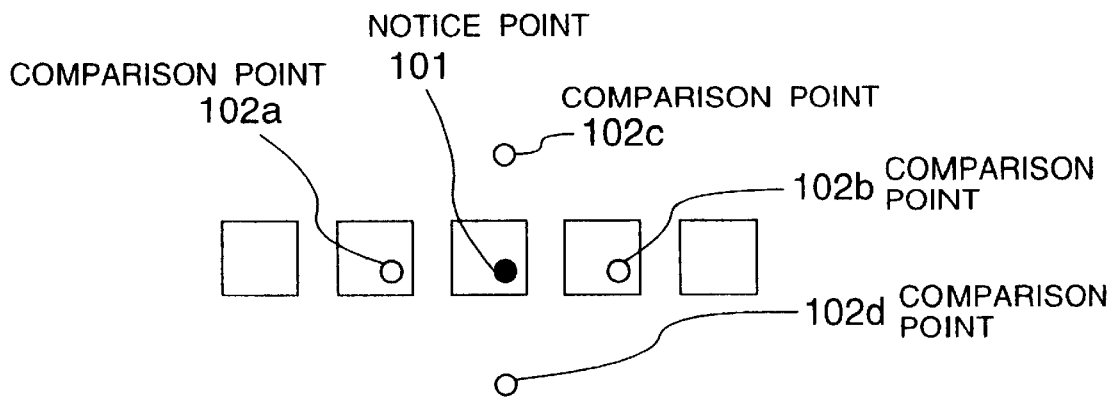
FIG. 6 is a schematic view useful in explaining comparison and inspection of the inside of a one-dimensional repetitive pattern in accordance with the present invention.

Next, the description will hereinbelow be given with respect to the basic idea of the present invention for such an object to be inspected. That is, according to the present invention, for a notice point 101, there is not prepared only one comparison point 102 but there are prepared a plurality of comparison points 102 of the subjects of comparison, and the image of the notice point 101 is compared with the images of these comparison points 102. Then, if the pattern of the notice point matches the pattern of any one of the comparison points with an allowable value, then it is judged that the pattern of the notice point is not the defect. For example, in the pattern to be inspected shown in FIG. 2, in order to inspect the pattern of the notice point 101 represented by the black symbol shown in FIG. 3, this pattern is compared with cross-like comparison points 102a, 102b, 102c and 102d each represented by an open symbol as a subject of comparison, i.e., patterns located in the positions each of which is integral multiples (in the figure, an example of +/−1 times is shown) of the repetitive pitch Qy of the direct peripheral circuit in the Y direction, and patterns located in the positions each of which is integral multiples (in the figure, an example of +/−1 times is shown) of the repetitive pitch Qx of the direct peripheral circuit in the X direction (first comparison). In this comparison result, if the pattern of the notice point 101 matches the pattern of any one of the comparison points 102a, 102b, 102c and 102d with an allowable value, then it is judged that the pattern of the notice point 102 is not the defect (normal pattern). For example, in the pattern to be inspected like the memory mat portion 3 having the repetition in the X direction and in the Y direction as shown in FIG. 3, even if the defect is present in any one of the comparison points 102a, 102b, 102c and 102d, then the pattern of the notice point 101 matches the pattern of any one of the comparison points 102a, 102b, 102c and 102d, and hence the pattern of the notice point is judged to be the normal pattern. Then, if the defect is present in the notice point 101, then the pattern of the notice point 101 mismatches the pattern of all the comparison points 102a, 102b, 102c and 102d, and hence it can be judged that the defect is present in the notice point 101. In addition, as shown in FIG. 6, in the pattern as well, to be inspected, as the direct peripheral circuit 4, 5 having the repetition only in one direction, even if the defect is present in any one of the comparison points 102a, 102b, 102c and 102d, then the pattern of the notice point 101 matches the pattern of any one of the comparison points 102a, 102b, 102c and 102d and hence the pattern of the notice point 101 is judged to be the normal pattern. Then, if the defect is present in the notice point 101, then the pattern of the notice point 101 mismatches the patterns of the comparison points 102a and 102b, and also the pattern of the notice point 101 also mismatches normally the patterns of the comparison points 102c and 102d. As a result, it can be judged that the defect is present in the notice point 101. However, in the case where the defect is present in the notice point 101, and also the pattern of the notice point 101 matches the patterns of the comparison points 102c and 102d since the image of the notice point 101 has the same variable density level as that of the images of the comparison points 102c and 102d, it cannot be judged that the defect is present in the notice point 101. That is, there can be considered the case where the shape of the detected defect varies. Then, the defect can be detected while maintaining the shape of the defect as much as possible by carrying out the selection of the comparison results in accordance with the calculation results of the matching degree.

Figure 4:
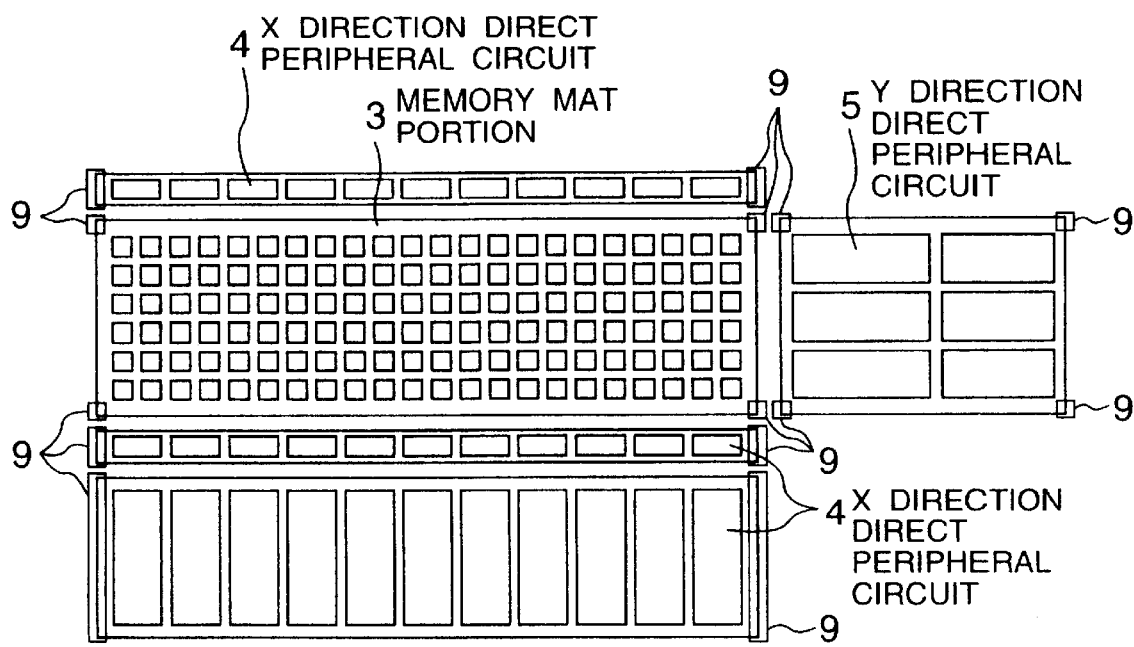
FIG. 4 is a schematic view showing inspection areas in the memory mat portion and the direct peripheral circuit in accordance with the present invention.

As a result, with respect to the memory mat portion 3 and the direct peripheral circuit 4, 5, as shown in FIG. 4, the cross comparison inspection becomes possible without setting the inspection area except for places 9, such as the corners each having the two-dimensional repetitive pattern, each of which has no repetition and each of which is represented by the heavy line. While the difference occurs in the place, such as the corner, having no repetition, the place where the difference occurs is common to the chips. Hence, these places are compared with one another between the chips, and the corner portions are eliminated, thereby enabling these areas to be excluded. On the other hand, the defect causes the difference in any of the two-stage comparison inspection (second comparison inspection), and hence can be recognized as the defect without being excluded.

In addition, in the above-mentioned comparison, the comparison employing the criterion of a plurality of stages is carried out, or the information relating to the matching degree is outputted in accordance with the necessity. This reason is that for the actual wafer, since the aligner for forming a pattern is used near the critical resolution, the fine difference (slightly smaller than 0.1 μm in the current exposure technique) occurs in the pattern shape depending on existence and non-existence of a pattern of the adjacent portion. In the case where the size of the defect to be detected is substantially equal to or smaller than that size, there is the possibility that when the detection sensitivity is not reduced in the end point of the repetition in which there is no pattern in the adjacent portion, this results in the false report in which the normal portion is judged to be the defect. When employing the usual criterion, that false report fulfills barely the criterion and hence is unstable. Then, there is supposed the case where that false report may not occur commonly to all the chips, and hence there is the possibility that the false report may not be excluded through the second comparison. For this reason, in the second comparison, the processing, in which if the pattern matching is obtained within the allowable range of the first comparison results, then the pattern of interest is not judged to be the defect, is carried out for the criterion of the defect judgement.

This defect judgement will hereinbelow be described in detail with reference to FIG. 3, and FIGS. 5 to 8. The pattern (digital image signals) of the notice point 101 is compared with the patterns (digital image signals) of the comparison points 102a, 102b, 102c and 102d, each of which is at a fixed distance from the notice point 101. In the inside of the portion in which the two-dimensional fixed repetition is obtained as shown in FIG. 3, the pattern of the notice point 101 matches all the patterns of the comparison points, each of which is at a fixed distance from the notice point 101, and hence it is not judged to be the defect. In other words, if any defect is present in the pattern of the notice point 101, then it is detected that the pattern of the notice point 101 mismatches all the patterns of the comparison points 102a, 102b, 102c and 102d, and hence the pattern of the notice point 101 can be judged to be the defect.

Figure 5:
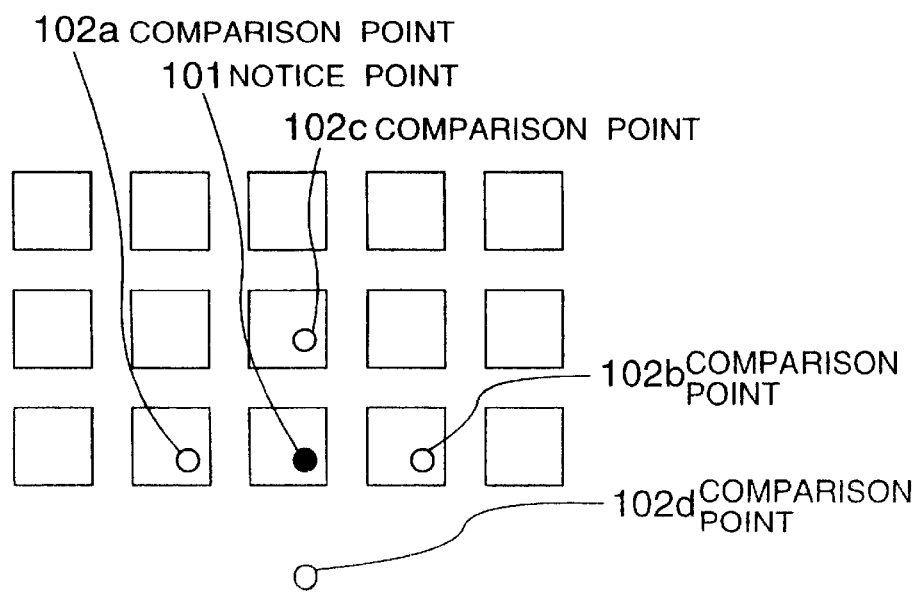
FIG. 5 is a schematic view useful in explaining comparison and inspection of the sides of the two-dimensional repetitive pattern in accordance with the present invention.

In the peripheral portion corresponding to the side of the portion having the two-dimensional fixed repetition as shown in FIG. 5, if all the patterns of the comparison points 102a, 102b, 102c and 102d, each of which is at a fixed distance from the pattern of the notice point 101, are the normal portions, then the pattern of the notice point 101 matches all the patterns of the comparison points 102a to 102d, and hence the pattern of the notice point 101 is not judged to be the defect. In other words, if any defect is present in the pattern of the notice point 101, then it is detected that the pattern of the notice point 101 mismatches all the patterns of the comparison points 102a, 102b, 102c and 102d, and hence the pattern of the notice point 101 can be judged to be the defect. But, since the pattern of the comparison point 102c is located in the end of repetition, the size thereof is finely different from that of the pattern of the notice point 101. For this reason, in the comparison of the pattern of the notice point 101 with the pattern of the comparison point 102c, even if the pattern of the comparison point 102c is the normal portion, then a certain degree of the difference occurs. In the comparison of the pattern of the notice point 101 with the pattern of the comparison point 102a as well as the comparison of the pattern of the notice point 101 with the pattern of the comparison point 102b, since each of the comparison points 102a and 102b is not located in the end of the repetition, if each of the patterns of the comparison points 102a and 102b is the normal portion, then it is expected that the patterns of the comparison points 102a and 102b are perfectly identical to each other.

Figure 7:
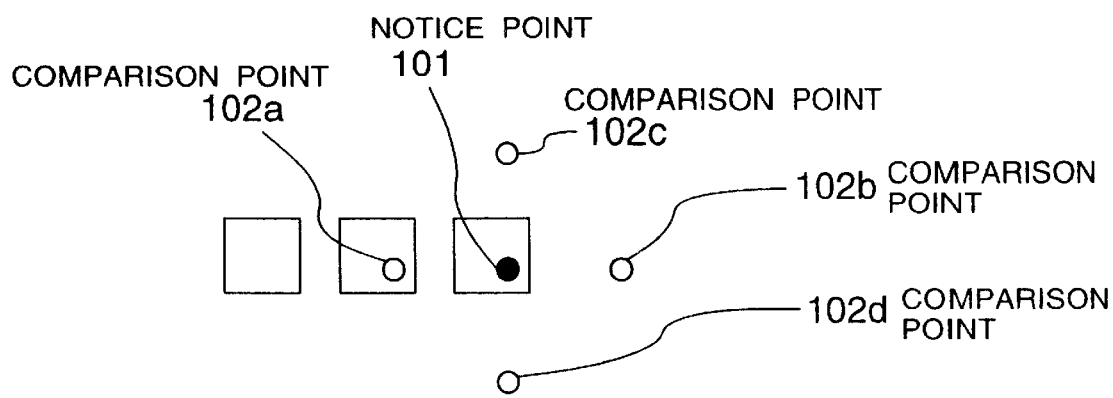
FIG. 7 is a schematic view useful in explaining comparison and inspection of the ends of a one-dimensional repetitive pattern in accordance with the present invention.

In the portion having the one-dimensional fixed repetition as shown in FIG. 6, the pattern of the notice point 101 matches all the patterns of the comparison points 102a and 102b each of which is at a fixed distance from the notice point 101 if all the patterns of the comparison points 102a and 102b are the normal portions. In the end of the one-dimensional fixed repetition as shown in FIG. 7, the pattern of the notice point 101 matches the pattern of the comparison point 102a, which is at a fixed distance from the notice point 101, if the pattern of the comparison point 102a is the normal portion. But, since the pattern of the comparison point 102a is located in the end of the repetition, the size thereof is finely different from that of the notice point 101. For this reason, in the comparison of the pattern of the notice point 101 with the pattern of the comparison point 102a, even if the pattern of the comparison point 102a is the normal portion, then a certain degree of the difference occurs. In the comparison of the pattern of the notice point 101 with the pattern of the comparison point 102c as well as the comparison of the pattern of the notice point 101 with the pattern of the comparison point 102d, since each of the comparison points 102c and 102d is not located in the end of the repetition, if each of the patterns of the comparison points 102c and 102d is the normal portion, then it is expected that the patterns of the comparison points 102c and 102d are perfectly identical to each other. As described above, in both the inside and the side of the two-dimensional repetition and the one-dimensional repetition which have been described with reference to FIG. 3, and FIGS. 5 to 7, in any case, the defect portion which is present in the notice point 101 becomes the defect candidate, and the normal portion does not become the defect candidate at all.

Figure 8:
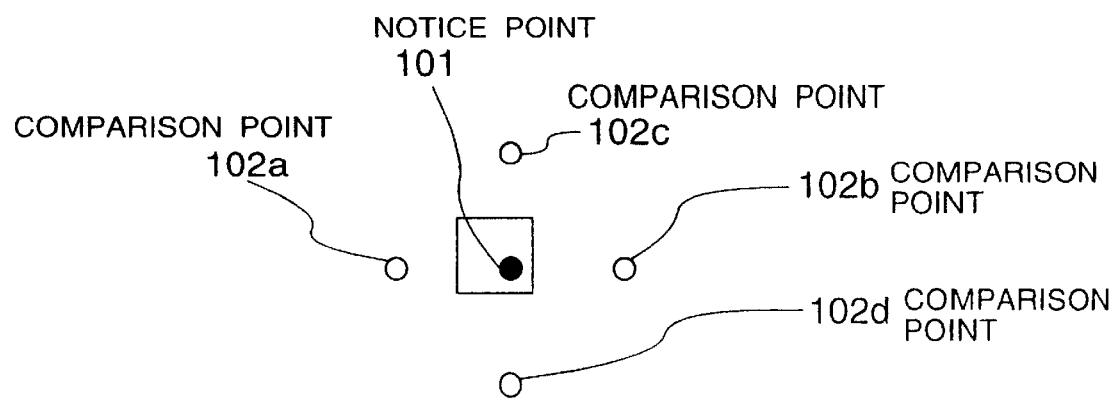
FIG. 8 is a schematic view useful in explaining comparison and inspection of the isolated point and the corner portions in accordance with the present invention.

On the other hand, in the corner portion or the isolated point of the two-dimensional fixed repetitive portion as shown in FIG. 8, the pattern of the notice point 101 mismatches all the patterns of the comparison points 102a, 102b, 102c and 102d, each of which is at a fixed distance from the notice point 101, even if all the patterns of the comparison points 102a to 102d are the normal portions, and hence the patterns of the comparison points 102a to 102d become the defect candidates.

These defect candidates are subjected to the second comparison inspection. In the second comparison inspection, the defects which have the same defect candidate coordinates between the different chips in the coordinate system having the origin within the chip as the reference, and in which the degrees of the pattern matching match one another within the allowable range, are excluded as the false defects. As a result, the corner or the isolated point of the two-dimensional fixed repetitive portion shown in FIG. 8 is excluded so that only the true defect can be extracted.

In addition, instead of the second comparison inspection, the false defects such as the isolated point and the like may be excluded by the comparison with the information, which is previously obtained, of the place having no repetition.

As described above, the X direction direct peripheral circuit 4 is repeatedly formed only in the X direction at repetitive pitches which are integral multiples (m*Px) of the repetitive pitch of the memory cells, and also the Y direction direct peripheral circuit 5 is repeatedly formed only in the Y direction at repetitive pitches which are integral multiples (n*Py) of the repetitive pitch of the memory cells. Therefore, by employing the above-mentioned cross comparison, the comparison inspection can be commonly carried out with respect to the memory mat portion 3 and the direct peripheral circuit 4, 5. Incidentally, the repetitive pitches (Px, Py) of the memory cells are changed in accordance with the kind of semiconductor wafer (the kind of memory) from which the semiconductor memories as the objects to be inspected will be manufactured. Therefore, it is necessary to change the distance from the notice point 101 to each of the above-mentioned cross-like comparison points 102a, 102b, 102c and 102d. However, the fatal fine defect, the size of which is equal to or smaller than half the minimum line width (equal to or smaller than 0.3 µm), can be detected with high sensitivity without setting the inspection areas with respect to the memory mat portion 3 and the direct peripheral circuit 4, 5.

The information relating to the detected defect is displayed on the display means such as a display and also transmitted to another processor such as a computer which manages the whole process through the communication line such as the LAN (Local Area Network), and is used as the data for use in managing the process in combination with the data from another inspection system and the process controller.

Figure 9:
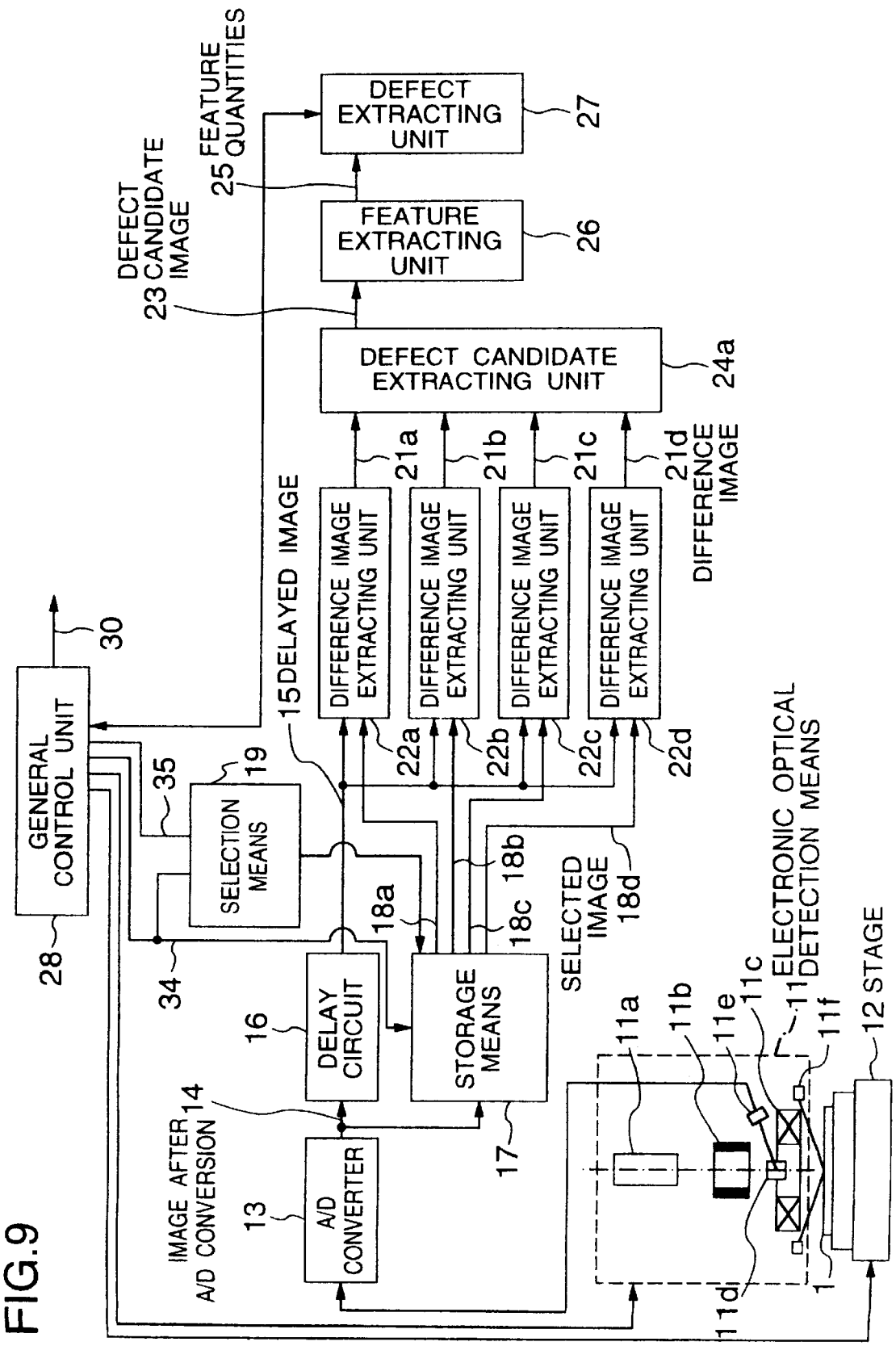
FIG. 9 is a schematic structural view showing a first embodiment of a method and a system for inspecting a pattern according to the present invention.

A first embodiment of the method and system for inspecting a pattern according to the present invention will hereinafter be described with reference to FIG. 9. FIG. 9 shows the construction of a first embodiment of a pattern inspection system. The pattern inspection system according to the present invention includes: electronic optical detection means 11 for detecting the physical property of a pattern of a wafer 1 as an object to be inspected by the Y direction scanning; a stage 12 for moving the wafer 1 in the X direction to form a two-dimensional image; A/D conversion means 13 for converting a two-dimensional pattern image signal which has been detected by the detection means 11 into two-dimensional digital image signals; a delay circuit 16 for obtaining an image 15 which is obtained by delaying the two-dimensional digital image 14, which has been obtained through the A/D conversion by the A/D conversion means 13, for a fixed time period; storage means (image memory) 17, which is comprised of a two-dimensional shift register for example, for storing therein the two-dimensional image 14 obtained through the A/D conversion by the A/D conversion means 13 over a predetermined two-dimensional scanning area; selection means 19 for selectively fetching a plurality of images 18a, 18b, 18c and 18d at distances of Dx and Dy, in the positive direction and in the negative direction, which are integral multiples of the X direction repetitive pitch Qx and the Y direction repetitive pitch Qy of the direct peripheral circuit 4, 5, from the images stored in the storage means 17; difference image extracting units (difference image extracting means) 22a, 22b, 22c and 22d for comparing an image 15 with images, 18a, 18b, 18c and 18d, respectively, to extract difference images 21a, 21b, 21c and 21d which are used to extract existence and non-existence of differences therebetween; a defect candidate extracting unit (defect candidate extracting means) 24a for calculating a defect candidate image on the basis of the difference images 21a, 21b, 21c and 21d; a feature quantity extracting unit (feature quantity extracting means) 26 for extracting feature quantities 25 such as the coordinates of a defect showing the occurrence positional information of the defect relating to the defect candidate from a defect candidate image 23, the degree of the pattern mismatching (a difference 62 between the variable density values based on the mismatching of the variable density indicated by the shaded area in FIG. 10(e) based on the difference between the variable density values showing a solid shape of the defect, an area S (indicated by the shaded area in FIG. 10(b)) of the defect showing the two-dimensional defect size, and the projection length Lx in the X direction and the projection length Ly in the Y direction; a defect extracting unit (defect extracting means) 27 for extracting a true defect on the basis of the feature quantities 25; and general control unit 28 including output means such as a recording medium, a printer, display means or the like for controlling the overall system. The general control unit 28 outputs the information relating to the extracted defects, as an output 30, to the communication means (not shown).

Incidentally, in order to align the wafer 1 as the object to be inspected, with which the stage 12 is loaded, with the optical axis of the detection means 11, the alignment marks for exposure which are formed in at least three positions in the periphery of the wafer 1 are imaged by an optical microscope and are converted into an image signal by photoelectric conversion means. Then, the positions of the three alignment marks are calculated on the basis of the displacement quantity of the stage of the displacement gauge or the laser length measuring device included in the stage, and on the basis of the positional coordinates of the three alignment marks thus calculated, the wafer 1 is aligned with the optical axis of the detection means 11 an with accuracy of equal to or smaller than 10 µm within one cell with respect to the X direction, the Y direction and the rotational (θ) direction. Since with respect to the rotational direction, the alignment is carried out with an accuracy of equal to or smaller than 10 µm within one cell in the outer periphery of the wafer, in the cross comparison, the positional deviation between the images becomes negligible.

The above-mentioned electronic optical detection means 11 includes, for example: an electron beam source 11a for emitting an electron beam; a beam deflector 11c for scanning the electron beam emitted from the electron beam source 11a to obtain an image; an objective lens 11b for focusing the electron beam on the surface of the wafer as the object to be inspected with a beam diameter of 0.02 to 0.2 µm; an ExB 11d for collecting the secondary electrons generated from the wafer to a secondary electron detector 11e; a focal position control unit (not shown) for adjusting the focal position between a height detection sensor 11f and the objective lens 11b; and a scanning control unit (not shown) for controlling the beam deflector 11c to realize the beam scanning. The current of the electron beam is in the range of 10 to 200 nA, the detected picture element size is in the range of 0.2 to 0.05 µm on the object to be inspected, and the acceleration voltage to the object to be inspected is 0.3 kV. The detected picture element size needs to be set to a value equal to or smaller than half the line width of the pattern of the object to be inspected.

Incidentally, the above-mentioned electronic optical detection means 11 may be optical image detecting means. In the case of this optical image detecting means as well, with respect to the detected picture element size, the foregoing is applied thereto.

Then, the pattern on the wafer 1 is scanned in the positive X direction while being scanned with a predetermined scanning width in the Y direction from the left-hand side in FIG. 3, for example, so that the two-dimensional image signal is detected by the electronic optical detection means 11 and then is converted into the digital image signals by the A/D conversion means 13. Then, the above-mentioned delay circuit 16 delays the digital images outputted from the A/D conversion means 13 for a fixed time period until all the digital images of the four points including the notice point as a subject of the cross comparison have been stored in the above-mentioned storage means (image memory) 17. That is, the above-mentioned delay circuit 16 delays the scanning quantity between the point X and the notice point so that, at the time when the digital image signals of the point X shown in FIG. 3 have been outputted from the A/D conversion means 13, the digital image of the notice point 101 is outputted from the delay circuit 16. As a result, the digital images with respect to the predetermined two-dimensional scanning area till the point X shown in FIG. 3 are stored in the storage means 17 on the basis of a reference address signal 34 obtained from the general control unit 28. Therefore, since the scanning quantity between the point X and the notice point is the known value, by the operation of the selection means 19, on the basis of the desired pitches Dx and Dy which are selected, in accordance with kind information 35 of the wafer 1 inputted from the general control unit 28, from the group of pitches Dx and Dy which are set in the inside of the general control unit 28 with different values for a plurality of kinds of wafers 1, the addresses of the comparison points 102a, 102b, 102c and 102d with respect to the address of the notice point 101 are specified to the memory means 17, and the digital image signals of the comparison points 102a, 102b, 102c and 102d are outputted from the storage means 17. Incidentally, the kind information of the wafer 1 may be directly inputted to the general control unit 28 using input means such as a keyboard, or may be inputted by reading a symbol, a character, a code or the like which is formed on the wafer 1 in order to represent the kind of the wafer 1.

These units and elements operate as follows in order to carry out the inspection. That is, the pattern of the wafer 1 is detected as the two-dimensional image signal by the detection means 11 synchronously with the scanning for the stage 12, and then is converted into the digital image signals by the A/D conversion unit 13, thereby obtaining both the digital image signals 14 and the digital image signals 15 of the notice point 101 which have been obtained by delaying the digital image signals 14 for the fixed time period. The digital image signals 14 which have been obtained at the same time are successively stored in the storage means 17 over the predetermined scanning area. Therefore, the digital image signals which are already stored in the storage means 17 for the predetermined scanning area include therein both the digital image signals 15 of the notice point 101 which have been obtained by the delay, and the digital image signals of the comparison points 102a and 102b which are, in terms of the coordinates, at the distance Dx (corresponding to Dx picture elements) in the positive X direction and in the negative X direction from the digital image signals 15 of the notice point 101 which are delayed.

The addresses of the comparison points 102a and 102b with respect to the address of the notice point 101 are specified to the storage means 17 on the basis of the pitches Dx and Dy which have been selected by the selection means 19, in accordance with the kind information 35 of the wafer 1 outputted from the general control unit 28, from the various kinds of pitches Dx and Dy which are previously set in the inside of the general control unit 28, whereby the digital image signals 18a, 18b, 18c and 18d of the comparison points 102a, 102b, 102c and 102d can be read out from the storage means 17 synchronously with the digital image signals 15 of the notice point 101 which are delayed to be extracted (cut out). At this time, the pitches Dx and Dy are respectively set to the values which are integral multiples of the X direction repetitive pitch Qx and the Y direction repetitive pitch Qy of the direct peripheral circuit 4, 5.

Next, the difference image extracting units 22a, 22b, 22c and 22d compare the digital image signals 15 of the notice point 101 with the digital image signals 18a of the comparison point 102a, the digital image signals 18b of the comparison point 102b, the digital image signals 18c of the comparison point 102c and the digital image signals 18d of the comparison point 102d, respectively, the digital image signals 18a, 18b, 18c and 18d having been extracted, and remove (subtract) the variation allowable value (variable density allowable value) of brightness based on the fine change of the shape when the pattern is normal, the variation allowable value (positional deviation allowable value) of brightness due to the positional deviation, and the pure noise components, as the comparison parameters, to extract (output) the resultant difference images 21a, 21b, 21c and 21d, respectively. That is, in the case where the difference is equal to or smaller than each of the comparison parameters in each of the difference images 21a, 21b, 21c and 21d, it is regarded that there is no difference (i.e., the difference is "0") and hence the matching is obtained.

The defect candidate image extracting unit 24 calculates the difference image showing the minimum difference (corresponding to the highest matching) from all the above-mentioned difference images 21a, 21b, 21c and 21d which have been extracted and also calculates the difference itself, other than the minimum value of the difference which is "0" (matching), as a defect candidate image signal 23. The feature quantity extracting unit 26 extracts a defect candidate area (defect shape) 61 as shown in FIG. 10(b) from the defect candidate image signal 23, and then extracts feature quantities 25 of the defect candidate such as the mismatching degree showing the solid shape of the defect (corresponding to a difference 62 between the variable density values based on the mismatching of the variable density indicated by the shaded area in FIG. 10(e)), the positional coordinates (e.g., the position G of the center of gravity) of the defect area 61 exhibiting the occurrence positional information of the defect, an area S (indicated by the shaded area in FIG. 10(b)) of the defect area 61 exhibiting the two-dimensional defect size, and the projection length Lx in the X direction and the projection length Lg in the Y direction. Then, these feature quantities 25 of the defect candidate are stored in the memory area of the defect extracting unit (defect extracting means) 27 as the processor. Further the feature quantities 25 of the defect candidate thus stored are lined up with the coordinates within the chip. Then, only the defect candidate which has, in the fixed range of the coordinates, the mismatching degree larger than the value which is obtained by adding the allowable threshold to the mean value of the mismatching degrees, the area larger than the value which is obtained by adding the allowable threshold thereto, or the projection length in the X direction and the projection length in the Y direction, each of which is larger than the value which is obtained by adding the allowable threshold thereto, is extracted as the true defect. The information relating to the true defect thus extracted is outputted by the output means (a recording medium, a printer, display means or the like) of the general control unit 28, or transmitted as an output 30 from the general control unit 28 to a computer, a server or the like which manages the overall process through the communication means such as the LAN (not shown).

Figure 10A:
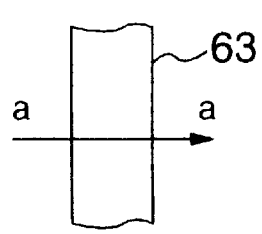
FIGS. 10a to 10e are schematic views useful in explaining the feature quantities in accordance with the present invention.
Figure 10B:
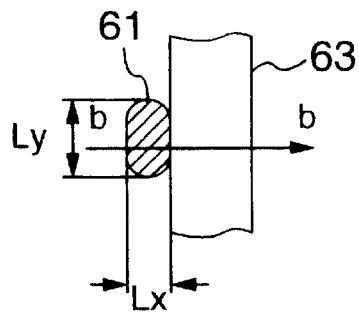
Figure 10C:
Figure 10D:
Figure 10E:

FIG. 10(a) shows a normal wiring pattern 63 for comparison, and FIG. 10(b) shows a wiring pattern 63 in which the defect candidate 61 is present. FIG. 10(c) shows a variable density image signal 64 showing brightness which is obtained from the scanning line a—a shown in FIG. 10(a), and FIG. 10(d) shows a variable density image signal 65 showing brightness which is obtained from the scanning line b—b shown in FIG. 10(b). FIG. 10(e) shows the mismatching degree (corresponding to the variable density values, based on the mismatching, which is indicated by the shaded area) 62 between the variable density image signals 64 and 65.

Figure 11:
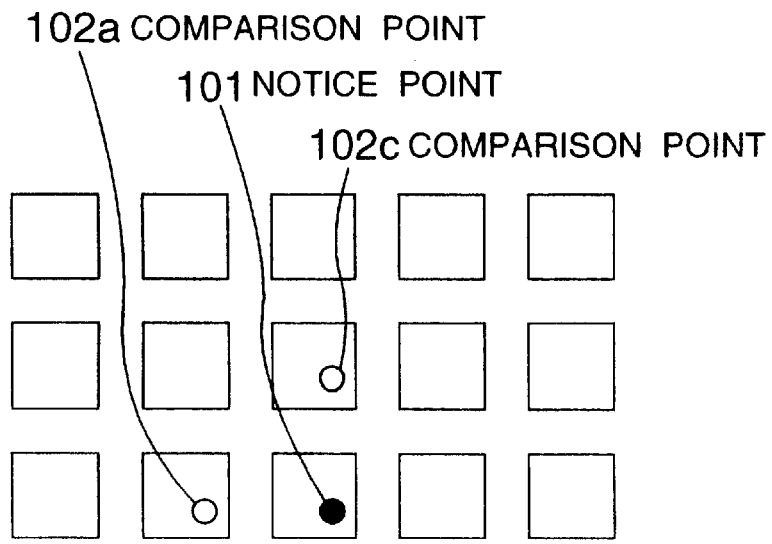
FIG. 11 is a schematic view useful in explaining a first modification of the first embodiment shown in FIG. 9.

In a first modification of the first embodiment, instead of the cross-like comparison, as shown in FIG. 11, the pattern of the notice point 101 is compared with the patterns of the two comparison points 102a and 102c in the X direction and in the Y direction, respectively. This feature is such that while the inspectable area is slightly reduced, the inspection can be realized with the simple method and system construction. That is, in the construction shown in FIG. 9, both the difference image extracting units 22b and 22d can be neglected.

Figure 12:
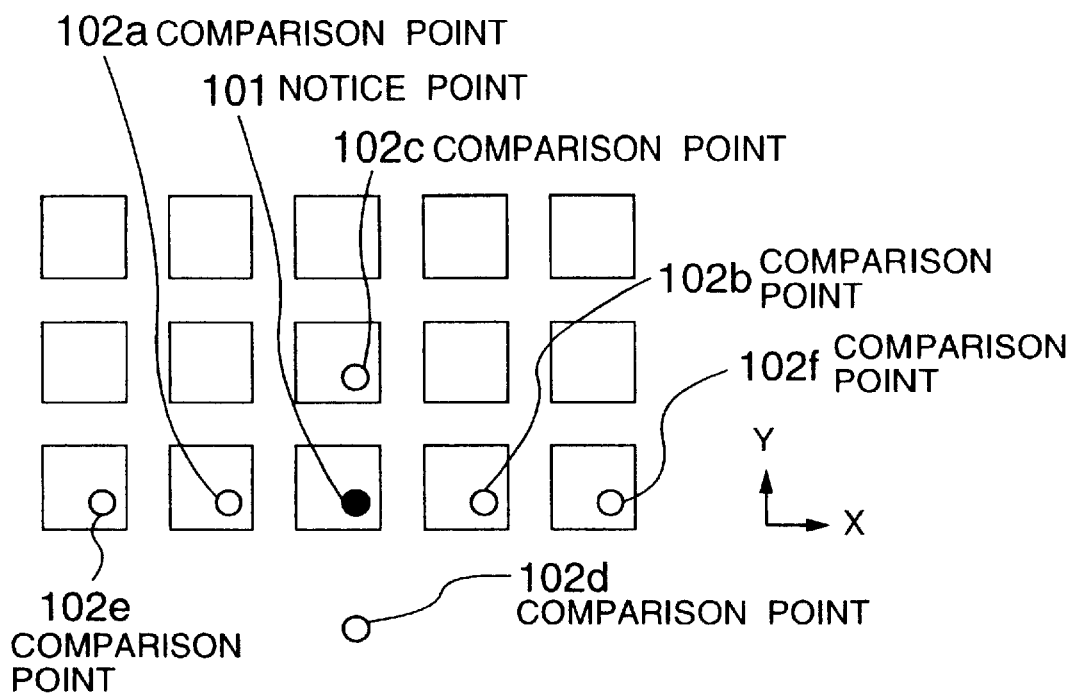
FIG. 12 is a schematic view useful in explaining a second modification of the first embodiment shown in FIG. 9.

In a second modification of the first embodiment, instead of the cross-like comparison, as shown in FIG. 12, in addition to the comparison of the pattern of the notice point 101 with the cross-like pattern of the comparison points, the pattern of the notice point 101 is compared with the patterns of two comparison points 102e and 102f arranged in the X direction. This feature is such that it is possible to cope with the case where a plurality of repetitive pitches are present. Likewise, it is considered that a plurality of comparison points are added in each of the X direction and the Y direction. In the case of the second modification, it is necessary to provide additionally difference image extracting units 22e and 22f.

According to the first embodiment of the present invention as described above, any defect of only the memory mat portion 3 and the direct peripheral circuit 4, 5 each having the repetition and both constituting the semiconductor memory, can be extracted without specifying the coordinates of the inspectable area, and also the inspection can be carried out by setting simply the parameters including the distances Dx and Dy between the notice point 101 and the comparison points 102.

Figure 13:
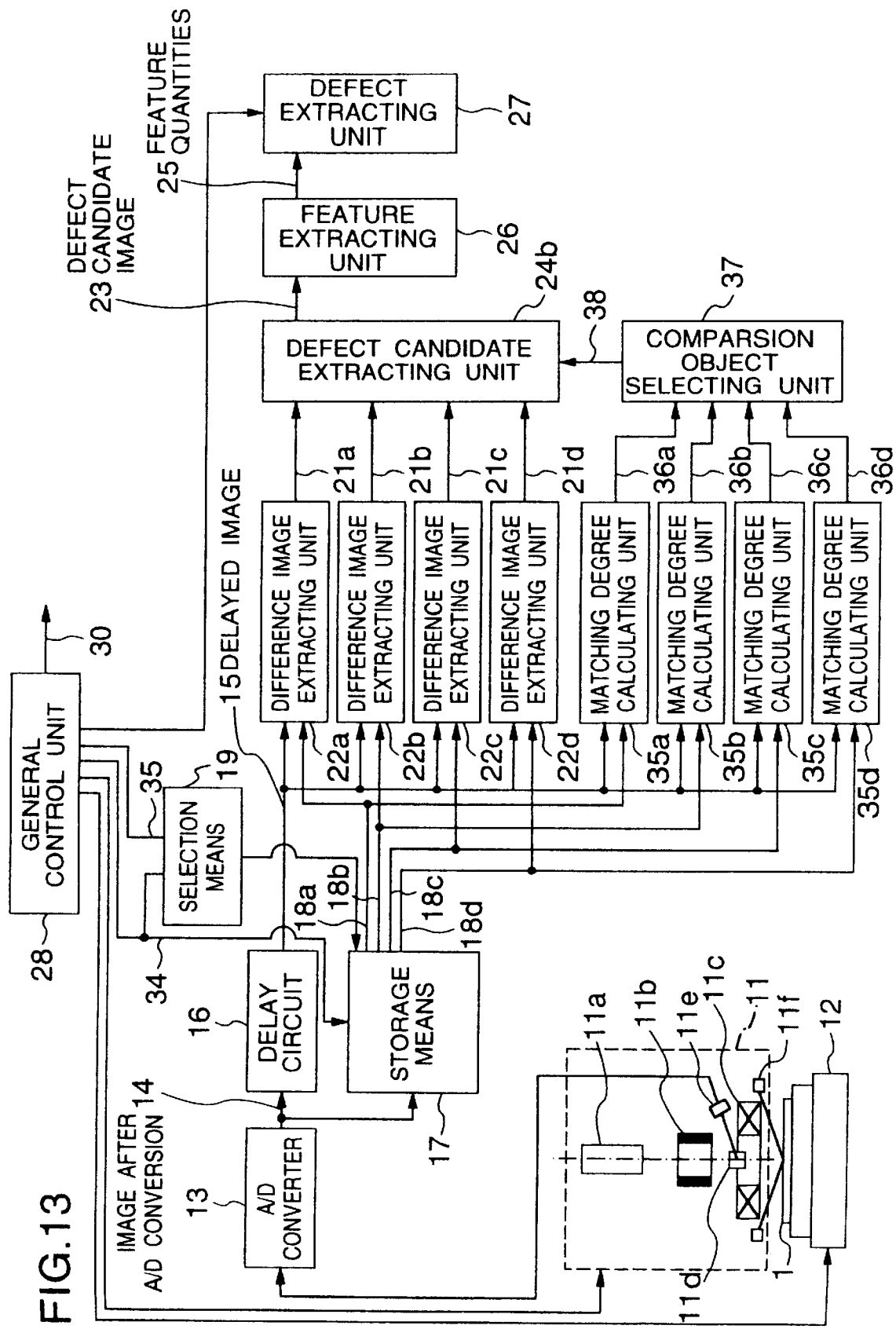
FIG. 13 is a schematic structural view showing a second embodiment of the method and the system for inspecting a pattern according to the present invention.

Next, a second embodiment of the method and system for inspecting a pattern according to the present invention will hereinafter be described with reference to FIG. 13. FIG. 13 shows the construction of the second embodiment of the pattern inspection system. In the second embodiment of the pattern inspection system according to the present invention, there are added to the first embodiment shown in FIG. 9: matching degree calculating units (matching degree calculating means) 35a, 35b, 35c and 35d for calculating matching degrees Diff a, Diff b, Diff c and Diff d between the digital image signals 15 and of notice point 101 and the digital image signals 18a, 18b, 18c and 18d of the comparison points 102a to 102d, for increasing the allowable value for the matching degrees Diff a, Diff b, Diff c and Diff d thus calculated, and for judging the pattern of the notice point to match the pattern of the comparison point of interest, including the vicinity thereof, unless the pattern of the notice point is greatly different from the pattern of the comparison point of interest, to regard each of the matching degrees Diff a, Diff b, Diff c and Diff d as "0" (Diff a=0, Diff b=0, Diff c=0 and Diff d=0); and a comparison object selecting unit 37 for outputting a selection signal 38 which is used to make selection, in a defect candidate extracting unit 24b, for judging, that the defect of interest is the defect candidate, from the different images (Comp a) 21a, (Comp b) 21b, (Comp c) 21c, and (Comp d) 21d obtained from the difference image extracting units (different image extracting means) 22a, 22b, 22c and 22d, in accordance with matching signals 36a, 36b, 36c and 36d which are obtained from the matching degree calculating units 35a, 35b, 35c and 35d, respectively. Incidentally, the digital images of the comparison points 102a to 102d which are used to extract the difference images in the difference image extracting units (different image extracting means) 22a to 22d may be produced from the design information in correspondence to the memory mat portion 3 and the direct peripheral circuit 4, 5 to be stored in the storage means 17. But, when reading out the digital images of the comparison points 102a to 102d, which are produced on the basis of the design information, from the storage means 17, the selection needs to be carried out on the basis of the selection signal 38 obtained from the comparison object selecting unit 37.

The matching calculating units 35a, 35b, 35c and 35d cut out, approximately similarly to the difference image extracting units (difference image extracting means) 22a to 22d, the difference images Diff a, Diff b, Diff c and Diff d, which have been obtained by removing (subtracting) the comparison parameters therefrom, every picture element memory range of 5×5 for example. Then, each of the matching degree calculating units 35a to 35d sets the data relating to the minimum difference image in the picture element memory range of 5×5 thus cut out as the value of the central picture element to subject the difference image signal represented by the approximate matching (i.e., the variable density difference is smallest in the picture element memory range of 5×5; the minimum difference image) to the two-dimensional enlargement processing. Then, each of them digitizes the resultant difference image signal with the large threshold, and obtains the matching unless the magnitude of the resultant difference image signal exceeds that large threshold, and also outputs surely, as the matching, the data relating to both the comparison point, the pattern of which is not greatly different from the pattern of the notice point, and its vicinity (within the picture element memory range of 5×5). That is, each of the matching degree calculating units 35a, 35b, 35c and 35d increases the allowable value (the threshold) and regards the patterns of the notice point and the comparison point as the matching unless the pattern of the notice point is greatly different from the pattern of the comparison point including its vicinity to output the matching signal. As a result, the comparison object selecting unit 37 can judge, even if the fine defect is present, whether the notice point 101 is in the state of the two-dimensional repetition, in the state of the repetition in the horizontal (X) direction, in the state of the repetition in the vertical (Y) direction, in the state of the end of the repetition, or in the state of the isolated point. More specifically, at the time when the four matching degree calculating units 35a, 35b, 35c and 35d have outputted the matching signals (Diff a to Diff d=0), the comparison object selecting unit 37 judges that the notice point 101 is in the state of the two-dimensional repetition, and then outputs the selection signal to the defect candidate extracting unit 24b so that the defect candidate extracting unit 24b outputs the minimum value (min (Comp a to Comp d)) of the four difference images (Comp a to Comp d) as the defect candidate. In addition, at the time when both the matching degree calculating units 35a and 35b out of the four matching degree calculating units 35a, 35b, 35c and 35d have outputted the matching signals (Diff a=0, Diff b=0), the comparison object selecting unit 37 judges that the notice point 101 is in the state of the repetition in the horizontal (X) direction and then outputs the selection signal to the defect candidate extracting unit 24b so that the defect candidate extracting unit 24b outputs the minimum value (min (Comp a, Comp b)) of the two difference images (Comp a, Comp b) in the horizontal (X) direction out of the four difference images as the defect candidate. In addition, at the time when both the matching degree calculating units 35c and 35d out of the four matching degree calculating units 35a, 35b, 35c and 35d have outputted the matching signals (Diff c=0, Diff d=0), the comparison object selecting unit 37 judges that the notice point 101 is in the state of the repetition in the vertical (Y) direction and then outputs the selection signal to the defect candidate extracting unit 24b so that the defect candidate extracting unit 24b outputs, as the defect candidate, the minimum value (min (Comp c, Comp d)) of the two difference images (Comp c, Comp d) in the vertical (Y) direction out of the four difference images. In addition, at the time when only any one of the four matching degree calculating units 35a, 35b, 35c and 35d has outputted the matching signal (only Diff a is 0, only Diff b is 0, only Diff c is 0, or only Diff c is 0), the comparison object selecting unit 37 judges that the notice point 101 is in the state of the end of the repetition and then outputs the selection signal to the defect candidate extracting unit 24b so that the defect candidate extracting unit 24b outputs, as the defect candidate, the difference image itself (Comp a, Comp b, Comp c, or Comp d), which has been judged to be the end point, out of the four difference images. Further, at the time when the four matching degree calculating units 35a, 35b, 35c and 35d have outputted the mismatching signals (Diff a to Diff d≠0), the comparison object selecting unit 37 judges that the notice point 101 is in the state of the isolated point and then outputs the selection signal to the defect candidate extracting unit 24b so that the defect candidate extracting unit 24b outputs, as the defect candidate, the minimum value (min (Comp a to Comp d)) of the four difference images (Comp a to Comp d). As a result, the defect candidate extracting unit 24b outputs, as the defect candidate, the minimum value (min (Comp a to Comp d)) of the four difference images (Comp a to Comp d) when the notice point 101 is in the state of the two-dimensional repetition, outputs, as the defect candidate, the minimum value (min (Comp a, Comp b)) of the two difference images (Comp a, Comp b) in the horizontal (X) direction when the notice point 101 is in the state of the repetition in the horizontal (X) direction, outputs, as the defect candidate, the minimum value (min (Comp c, Comp d)) of the two difference images (Comp c, Comp d) in the vertical (Y) direction when the notice point 101 is in the state of the repetition in the vertical (Y) direction, outputs, as the defect candidate, the difference image itself (Comp a, Comp b, Comp c, or Comp d), which is judged to be the end point, when the notice point 101 is in the state of the end point of the repetition, and outputs, as the defect candidate, the minimum value (min (Comp a to Comp d)) of the four difference images (Comp a to Comp d) when the notice point 101 is in the state of the isolated point. Then, the processings in the feature extracting unit (feature extracting means) 26 and the defect extracting unit (defect extracting means) 27 are the same as these in the first embodiment of the pattern inspection system shown in FIG. 9.

Figure 14:
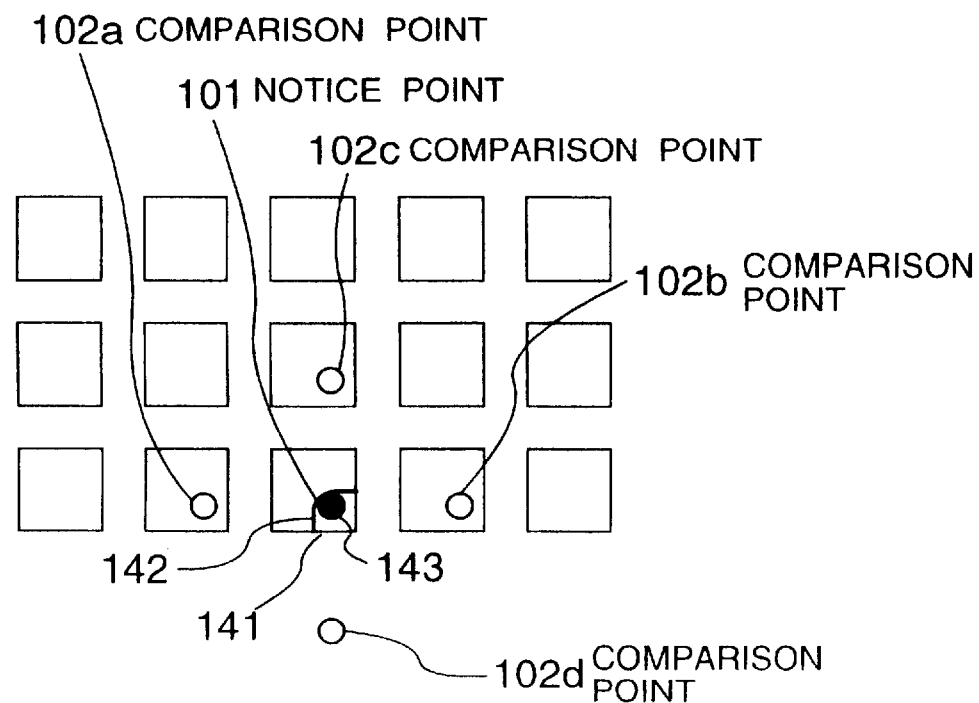
FIG. 14 is a view useful in schematically explaining that in the second embodiment of the pattern inspecting method and the system for use in such a method according to the present invention, the shape of a defect is faithfully extracted as the defect candidate.

In the first embodiment of the pattern inspection system shown in FIG. 9, the defect candidate image extracting unit 24a outputs, as the defect candidate image signal 23, the difference image exhibiting the minimum value (exhibiting the most matching degree) of the difference (mismatching) out of all the difference images 21a, 21b, 21c and 21d. In this case, as schematically shown in FIG. 14, while the data relating to a fine defect 141 is outputted as the defect candidate signal without losing its contour (which has the fine stepped portion so that the large change occurs in the variable density signal ) 142, there is the possibility that the pattern of a flat portion 143 of the fine defect 141 may match the pattern of the comparison point 102d and be unrecognized. As a result, there is also the possibility that the defect candidate signal may be outputted in which the shape of the fine defect is changed. In particular, in the case where the fine defect 141 is the lack defect, it is considered that the image of the notice point 101 having the fine defect may match the image of the pattern of the comparison point 102d having no repetition. As a result, in the first embodiment, the possibility that the situation may occur in which only the contour of the fine defect 141 is extracted is large.

However, in the second embodiment of the pattern inspection system shown in FIG. 13, the data relating to the defect itself can be faithfully outputted as the defect candidate signal 23 without changing the shape and the like of the defect, and hence as compared with the first embodiment, the highly reliable inspection of the fine defect can be realized on the basis of the cross comparison.

Figure 15:
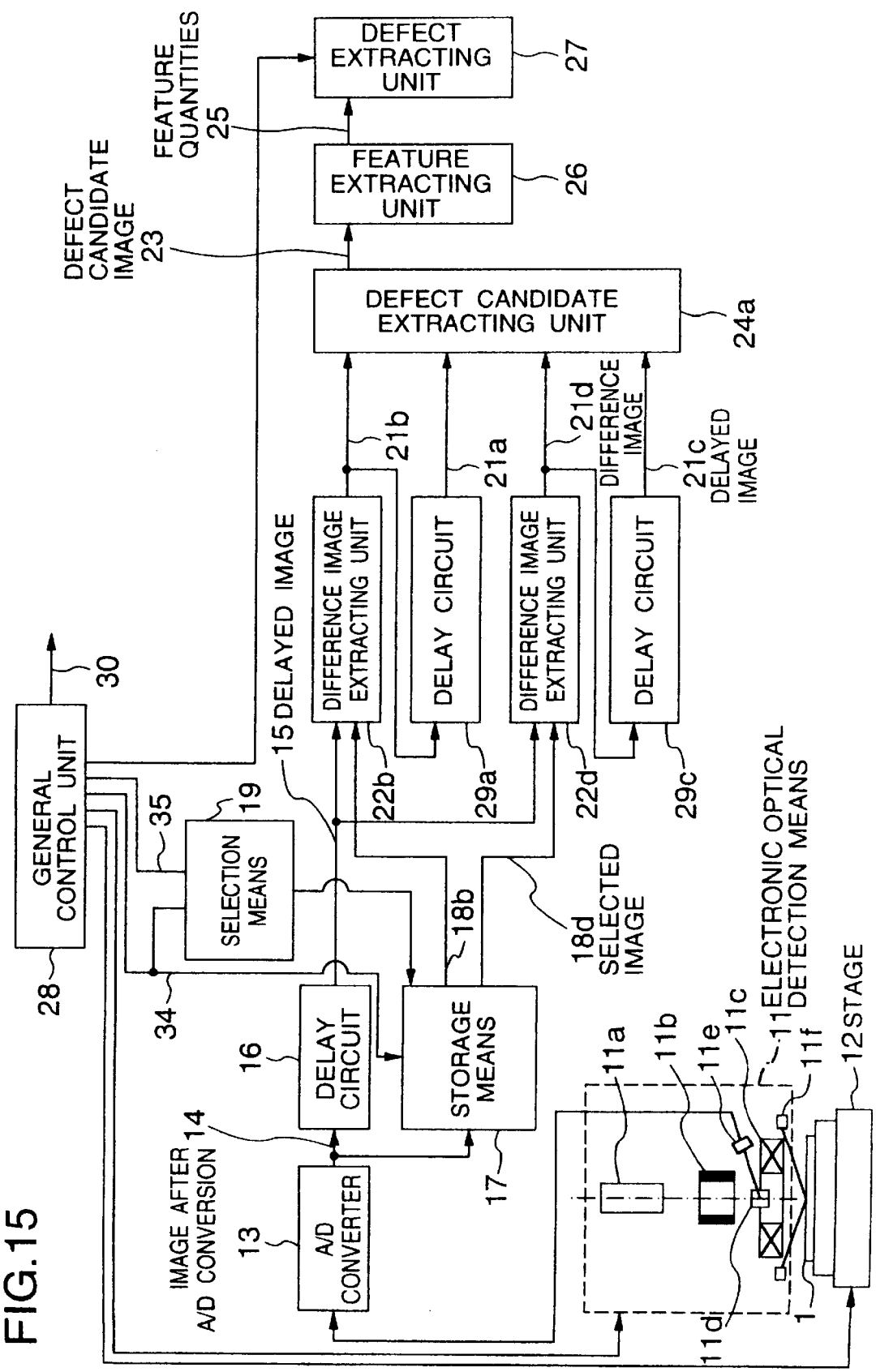
FIG. 15 is a schematic structural view showing a third embodiment of the method and the system for inspecting a pattern according to the present invention.

Next, a third embodiment of the method and system for inspecting a pattern according to the present invention will hereinafter be described with reference to FIG. 15. FIG. 15 shows the third embodiment of the pattern inspection system. In the third embodiment of the pattern inspection system according to the present invention, a point of difference in construction from the first embodiment of the pattern inspection system shown in FIG. 9 is that the difference image 21a between the notice point 101 and the comparison point 102a which is outputted from the difference image extracting unit 22a is obtained by delaying the difference image obtained from the difference image extracting unit 22b for a time period required for scanning the distance from the notice point 101 to the comparison point 102a in the X-direction scanning when detecting the image, using a delay circuit 29a constituted by a 1-raster shift resister and the like for example. When the data relating to the difference image 21a is outputted from the delay circuit 29a, naturally, the data of the difference image 21b between the notice point 101 and the comparison point 102b is outputted from the difference image extracting unit 22b. That is, the information of both the difference images 21a and 21b described in the first embodiment is included in the difference image obtained from the difference image extracting unit 22b. The difference image 21b is obtained by comparing the notice point 101 with the comparison point 102b which is at a distance of the picture elements corresponding to Dx from the notice point 101 in the positive X direction, while the difference image 21a is obtained by comparing the notice point 101 with the comparison point 102a which is at a distance of the picture elements corresponding to Dx from the notice point 101 in the negative X direction. In other words, if in the difference image 21a, the notice point is substituted for the comparison object, then the difference image 21a becomes equal to the image which is obtained by shifting the difference image 21b by the picture elements corresponding to Dx in the negative X direction.

In addition, the difference image 21c between the notice point 101 and the comparison point 102c which is outputted from the difference image extracting unit 22c is obtained by delaying the difference image obtained from the difference image extracting unit 22d for a time period required for scanning the distance from the notice point 101 to the comparison point 102c in the Y-direction scanning when detecting the image, using a delay circuit 29c which is, for example, constituted by arranging a large number of 1-raster shift registers in the Y direction. When the data relating to the difference image 21c is outputted from the delay circuit 29c, naturally, the data relating to the difference image 21d between the notice point 101 and the comparison point 102d is outputted from the difference image extracting unit 22d. That is, the information of both the difference images 21c and 21d is, likewise, included in the difference image obtained from the difference image extracting unit 22d. The difference image 21d is obtained by comparing the notice point 101 with the comparison point 102d which is at a distance of the picture elements corresponding to Dy from the notice point 101 in the positive Y direction, while the difference image 21c is obtained by comparing the notice point 101 with the comparison point 102c which is at a distance of the picture elements corresponding to Dy from the notice point 101 in the negative Y direction. In other words, if in the difference image 21c, the notice point is substituted for the comparison object, then, the difference image 21c becomes equal to the image which is obtained by shifting the difference image 21d by the picture elements corresponding to Dy in the negative Y direction.

However, there is the case where the distances from the notice point to the X direction and Y direction comparison points are changed depending on the kind of wafer 1 as the object to be inspected. Therefore, the delay times in the delay circuits 29a and 29c need to be changed on the basis of the information of the distances from the notice point 101 to the X direction and Y direction comparison points 102, which information is obtained from the selection means 19.

As described above, similarly to the first embodiment shown in FIG. 9, the number of difference image extracting units required for carrying out the complicated processing such as the extraction of the comparison parameters is reduced by half as compared with the first embodiment, and the delay circuits each having the simple configuration are provided, whereby any defect in only the memory mat portion 3, the X direction direct peripheral circuit 4 and the Y direction direct peripheral circuit 5 each having the repetition can be extracted without specifying the coordinates of the inspection possible area, and also the inspection can be carried out on the basis of the simple parameter setting.

It will be apparent that the third embodiment can be naturally applied to the above-mentioned second embodiment.

Figure 16:
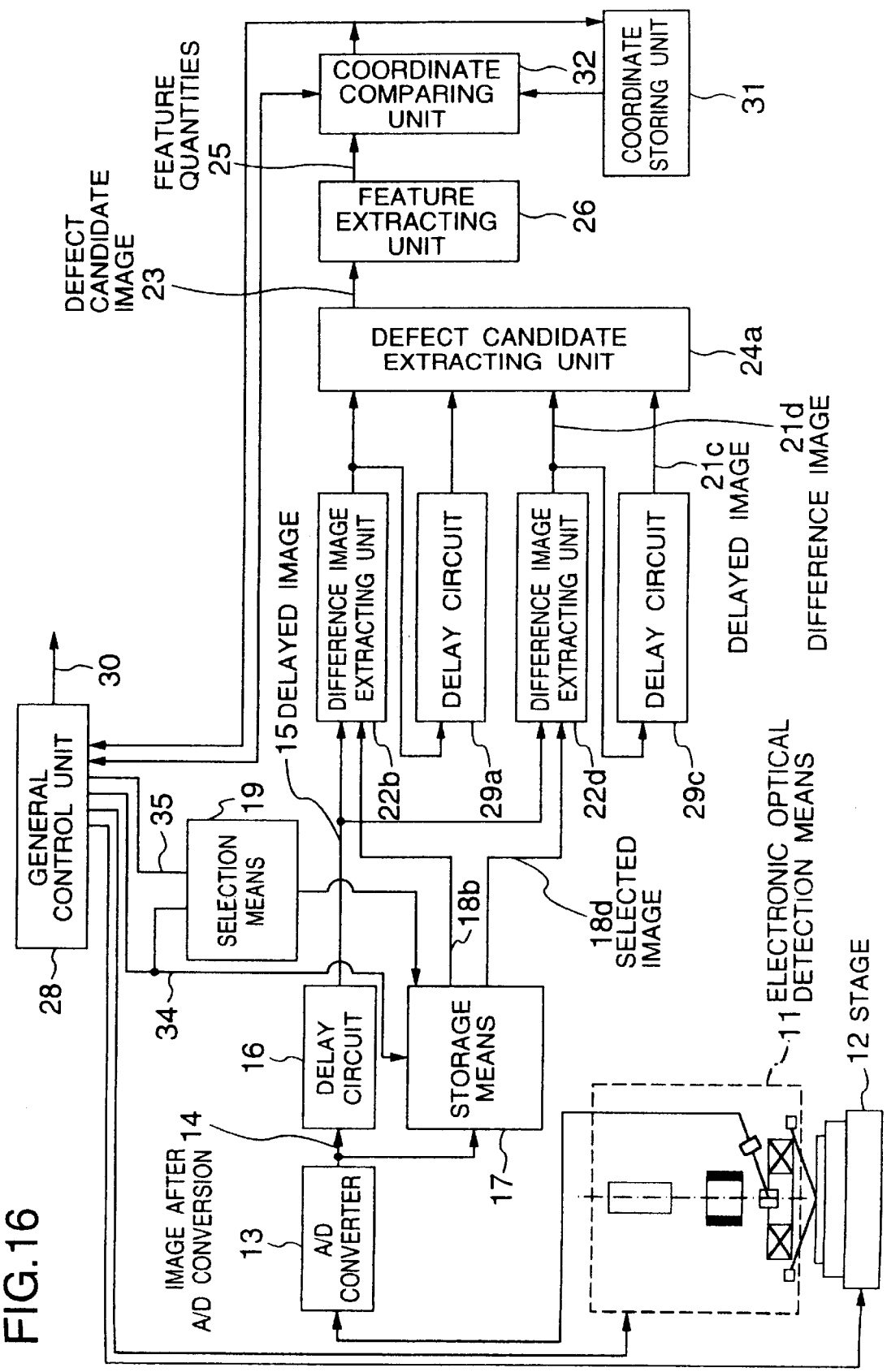
FIG. 16 is a schematic structural view showing a fourth embodiment of the method and the system for inspecting a pattern according to the present invention.

Next, a fourth embodiment of the method and system for inspecting a pattern according to the present invention will hereinafter be described with reference to FIG. 16. FIG. 16 shows the fourth embodiment of the pattern inspection system. In the fourth embodiment of the pattern inspection system according to the present invention, a point of difference from the third embodiment of the pattern inspection system shown in FIG. 15 is that instead of the defect extracting unit 27, there are provided: an isolated point storage unit 31 for storing previously therein the coordinates of the place having no repetition; and a coordinate comparison unit 32 for excluding any defects, out of the defect candidates, having the coordinates matching the coordinate information of the place having no repetition, which coordinate information is previously stored, to extract the true defect. This coordinate comparison unit 32 has the same function as that of the defect extracting unit 27 in the first to third embodiments.

Then, the feature quantity extracting unit 26 extracts, as shown in FIG. 10(b), the defect candidate area (defect shape) 61 from the defect candidate image 23, and also extracts the feature quantities 25 of the defect candidate such as the mismatching degree (corresponding to the difference 62 between the variable density values based on the mismatching of the variable density indicated by the shaded area in FIG. 10(e)) exhibiting the solid shape of the defect, the position coordinates (e.g., the position G of the center of gravity) of the defect area 61 exhibiting the occurrence positional information of the defect, the area S (indicated by the shaded area in FIG. 10(b)) of the defect area 61 exhibiting the two-dimensional size of the defect, and the projection length Lx in the X direction and the projection length Ly in the Y direction. These feature quantities 25 of the defect candidate area stored in the memory area of the coordinate comparison unit 32 as the processor. In the coordinate comparison unit 32, the feature quantities 25 of the defect candidate thus stored are lined up with the coordinates within the chip on the basis of the position coordinates (e.g., the position G of the center of gravity) of the defect area 61 showing the occurrence position information of the defect. Then, any of the defect candidates the coordinates of which match, in the fixed coordinate range (for example, the coordinates of the isolated point which are previously stored in the coordinate storage unit 31) is excluded to extract only the true defect. The information relating to the true defect thus extracted is outputted through the output means (a recording medium, a printer, display means or the like) or transmitted to the computer which manages the overall process through the network.

Incidentally, the coordinate data of the isolated point which is previously stored in the coordinate storage unit 31 may be registered, in the form of the design information of the inspection object, the place which is registered on the basis of the inspection by the worker, or the combination thereof, using the input means which is, for example, provided in the general control unit 28.

In the fourth embodiment as well, by applying the first modification of the first embodiment thereto, the second comparison inspection is carried out, and the coordinates of the false defects which can be excluded are registered in order to exclude them. As a result, the coordinates to be registered can be specified to the coordinate storage unit 31 with fewer processes.

According to the fourth embodiment, since the coordinates of any of the defect candidates are compared with the coordinates which are previously stored, any of the false defects can be surely excluded.

Naturally, it will be apparent that the fourth embodiment can be applied to the above-mentioned first and second embodiments as well.

Figure 17:
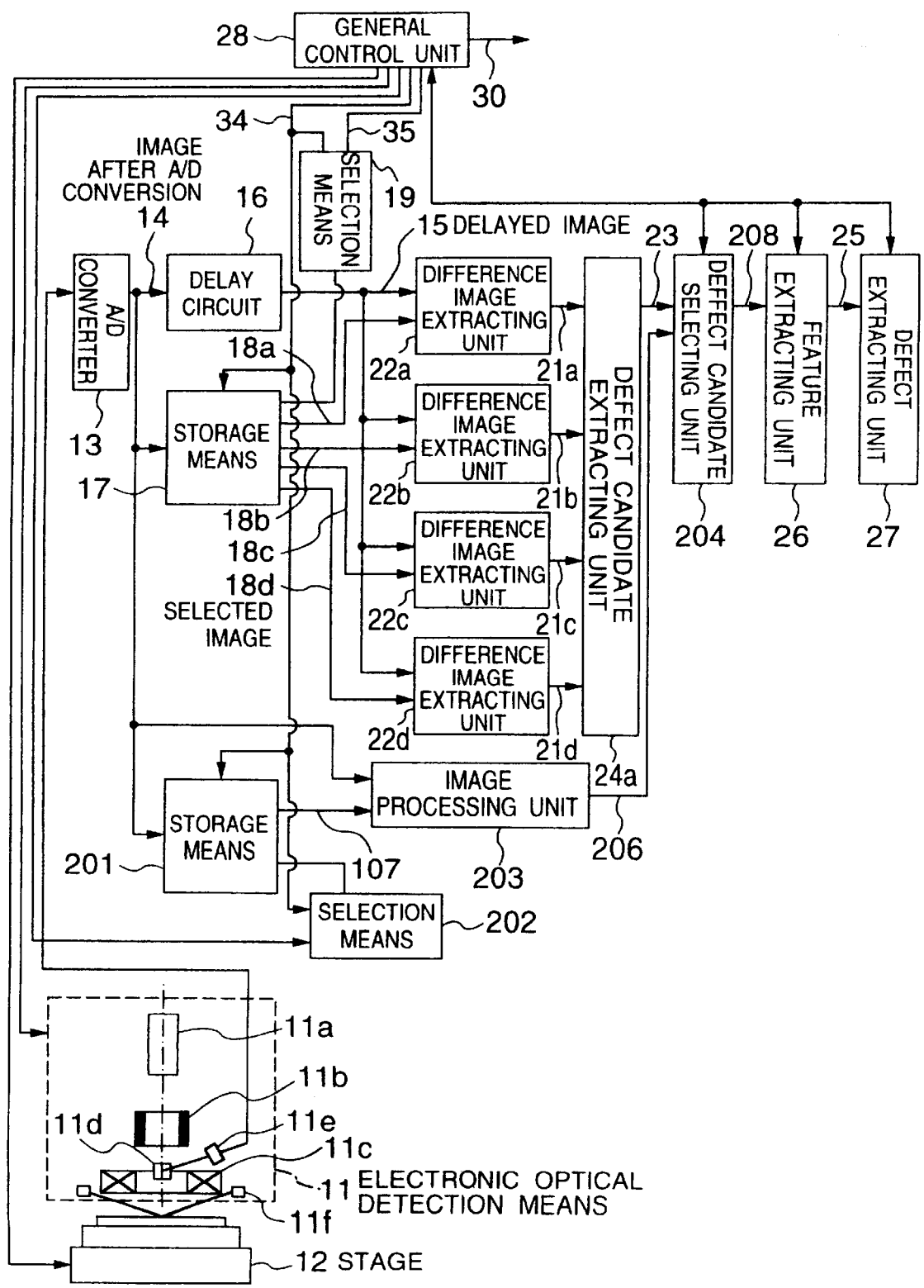
FIG. 17 is a schematic structural view showing a fifth embodiment of the method and the system for inspecting a pattern according to the present invention.

Next, a fifth embodiment of the method and system for inspecting a pattern according to the present invention will hereinafter be described with reference to FIG. 17. FIG. 17 shows the fifth embodiment of the pattern inspection system. A point of difference of the fifth embodiment from the first embodiment is that there are provided: storage means 201 for storing therein the data of the images 14 after the A/D conversion which are used to detect a defect candidate image 206 based on the chip comparison; selection means 202 for fetching selectively the image 207 at a distance backwardly which is integral multiples of the chip, from the images stored in the storage means 201; image processing means 203 for comparing the currently detected image 14 with the image 207, selected by the selection means 202, at a distance backwardly which is integral multiples of the chip to calculate the defect candidate image 206; and defect candidate selecting means 204 for selecting both the defect candidate image 23 based on the cross comparison which is obtained from the defect candidate extracting means 24 and the defect candidate image 206 of the chip comparison, on the basis of the coordinate data of the inspection place which is obtained in the general control unit 28.

The defect candidate image extracting means 24 calculates the minimum value (the difference image having the most matching) over the different images 21a, 21b, 21c and 21d which have been extracted in the difference image extracting means 22a to 22d, respectively, thereby calculating the defect candidate image 23 based on the cross comparison.

On the other hand, both the image before one chip and the digital image 14 which are previously stored in the storage means 201 are subjected to the image processing to calculate the defect candidate image 206 based on the chip comparison. The defect candidate selecting unit 204 receives both the defect candidate image 23 based on the cross comparison and the defect candidate image 206 based on the chip comparison to fetch a defect candidate image 208 which has been selected on the basis of the candidate data of the area of the memory mat portion 3 and the direct peripheral circuit 4, 5 on the chip, and the area of the direct peripheral circuit 6 thereon. That is, the defect candidate selecting unit 204 selects the defect candidate image 23 based on the cross comparison with respect to the area of the memory mat portion 3 and the direct peripheral circuit 4, 5 on the chip, and selects the defect candidate image 206 based on the chip comparison with respect to the area of the indirect peripheral circuit 6 on the chip to output the defect candidate image thus selected as the defect candidate image 208.

The feature quantity extracting unit 26 extracts the defect candidate area (defect shape) 61 as shown in FIG. 10(b) from the defect candidate images 208 thus selected, and also extracts the feature quantities 25 of the defect candidate such as the mismatching degree (corresponding to the difference 62 between the variable density values based on the mismatching of the variable density indicated by the shaded area in FIG. 10(e), the position coordinates (e.g., the position G of the center of gravity) of the defect area 61 exhibiting the occurrence position information of the defect, the area S (indicated by the shaded area in FIG. 10(b)) of the defect area 61 exhibiting the two-dimensional size of the defect, and the projection length Lx in the X direction and the projection length Ly in the Y direction. These feature quantities 15 of the defect candidate are then stored in the memory area of the feature extracting unit 26 as the processor. Then, the feature extracting unit 26 lines up the feature quantities 25 of the defect candidate thus stored with the coordinates within the chip, and also extracts, as the true defect, only the defect candidate having the mismatching degree larger than the level which is obtained by adding the allowable threshold to the mean value of the mismatching degree, within a fixed coordinate range for example. Incidentally, the defect candidate selecting unit (defect candidate selecting means) 204 selects, on the basis of the coordinate data of the inspection place, the defect candidate image 23 based on the cross comparison in the case of the memory mat portion 3, the X direction direct peripheral circuit 4 and the Y direction direct peripheral circuit 5 each having the repetition, and selects the defect candidate image 206 based on the chip comparison in the case of another indirect peripheral circuit 6.

According to the fifth embodiment, the inspection can be carried out with the combination of the cross comparison and the chip comparison, and also any of the defects in the indirect peripheral circuit 6 as well as any of the defects in the memory mat portion 3, the X direction direct peripheral circuit 4 and the Y direction direct peripheral circuit 5, each having the repetition, can be detected.

Naturally, it will be apparent that the fifth embodiment can be applied to the above-mentioned second, third and fourth embodiments as well.

While in all the first to fifth embodiments as described above, the description has been given with respect to the case of the system employing the electronic optical detection means, it is to be understood that even in the system employing any of detection means such as optical detection means, all the embodiments can be implemented similarly.

According to the present invention, by the simple specification of the inspection area, the highly reliable inspection can be carried out.

In addition, according to the present invention, by the simple specification of the inspection area, the defects in all the areas each having the small scale repetition can be inspected at high speed and with high reliability.

In addition, according to the present invention, for the semiconductor wafer in which the memory mat portion and the direct peripheral circuit each having the repetitive pattern are formed, any of the defects can be inspected with high reliability so that the high quality semiconductor wafer can be manufactured.

While the present invention has been particularly shown and described with reference to the preferred embodiments and the specified modifications thereof, it will be understood that the various changes and other modifications will occur to those skilled in the art without departing from the scope and true spirit of the invention. The scope of the invention is therefore to be determined sololy by the appended claims.

What is claimed is:

1. A pattern inspection system comprising:

imaging means for imaging an object to be inspected, said object having a plurality of chips thereon and each chip having essentially the same pattern, by scanning a focused electron beam having a diameter of 0.02 to 0.2 μm on the object and detecting electrons emanated from the object by the scanning;

a height detection sensor which detects a height of the object that has the plurality of chips formed thereon;

means for adjusting a focal position of the focused electron beam using an output of the height detection sensor;

A/D conversion means for converting an image signal of the object to be inspected which has been imaged by said imaging means into digital image signals;

first defect candidate extracting means for comparing the digital image signals of a repetitive pattern of a notice point of one of said chips to be inspected with the digital image signals of an adjacent repetitive pattern of comparison points of the chip, corresponding to the notice point, which should be essentially the same as the pattern of the notice point, in order to extract a first defect candidate of the notice point;

second defect candidate extracting means for comparing the digital image signals of a non-repetitive pattern in a notice chip on the object to be inspected with the digital image signals of a non-repetitive pattern of comparison points of an adjacent chip, corresponding to the notice chip, which should be essentially the same as the pattern of the nonrepetitive pattern of the notice chip in order to extract a second defect candidate of the notice chip;

defect candidate selecting means for receiving the extracted first and second defect candidates, selecting one of the first defect candidate and the second defect candidate, and outputting the selected defect candidate;

defect detecting means for detecting a true defect from the selected defect candidate; and output means for outputting therethrough information relating to the true defect thus detected.

2. A pattern inspection system according to claim 1, wherein said first defect candidate extracting means includes: difference image extracting units for extracting difference images between the digital image signals of the notice point and the digital image signals of the comparison points, and a defect candidate extracting unit for comparing the difference images which have been extracted by said difference image extracting units with a preset value to extract the first defect candidates.

3. A pattern inspection system according to claim 1, wherein said defect detecting means includes: a feature quantity extracting unit for extracting feature quantities of the selected defect candidate which has been output by said defect candidate selecting means; and a defect extracting unit for detecting a true defect on the basis of the feature quantities of the defect candidates which have been extracted by said feature quantity extracting unit.

4. A pattern inspection system according to claim 3, wherein said defect extracting unit detects, as the true defect, a defect candidate which occurs irregularly on the object to be inspected.

5. A pattern inspection system according to claim 4, wherein said first defect candidate extracting means includes storage means for storing therein the digital image signals of the non-repetitive pattern of comparison points of the adjacent chip.

6. A method of inspecting a pattern, comprising the following steps:

adjusting a focal position of a focused electron beam by using an output of a height detection sensor which detects a height of an object having a plurality of pattern groups formed thereon;

using imaging means, imaging the object by scanning the focused electron beam having a diameter of 0.02 to 0.2 μm on the object and detecting electrons emanated from the object by the scanning to obtain two-dimensional digital image signals of the object, each pattern group having repetitive patterns and non-repetitive patterns, and said digital image signals being obtained by A/D conversion means converting analog image signals of the scanned object;

comparing digital image signals of a repetitive pattern to be compared in one of the plurality of pattern groups with reference digital image signals of another repetitive pattern of the same pattern group;

comparing digital image signals of a non-repetitive pattern to be compared in one of the plurality of pattern groups with reference digital image signals of a non-repetitive pattern in another of said pattern groups;

receiving output results of said comparing steps;

selecting between the output results of the repetitive pattern comparing step and the output results of the non-repetitive pattern comparing step;

determining, using defect candidate determining means, whether a defect exists in the pattern of said one of the pattern groups, based upon the results of the selected comparing step; and outputting, using output means, information relating to a result of the determining step.

7. A method according to claim 6, wherein said another pattern group is adjacent to said one of the pattern groups in the object to be inspected.

8. A method according to claim 6, wherein said another pattern group is perpendicularly adjacent to said one of the pattern groups.

9. A method according to claim 6, wherein when the results of the selected comparing step show that the digital image signals of the compared patterns do not match, the determining step determines that the pattern of said one of the pattern groups is a defect candidate, and a true defect is extracted from the defect candidate thus determined.

10. A method of inspecting a pattern, comprising the following steps:

adjusting a focal position of a focused electron beam by using an output of a height detection sensor which detects a height of an object on which a plurality of pattern groups are formed, each pattern group having essentially the same pattern;

scanning the focused electron beam on the object;

imaging the object by detecting electrons emanated from the object by the scanning to obtain image signals of the object;

comparing image signals of a repetitive pattern of a notice point of a chip with image signals of a repetitive pattern of a reference point of the chip which is essentially the same as the repetitive pattern of the notice point;

comparing an image signal of a non-repetitive pattern of a notice chip with a non-repetitive pattern of a reference chip which is essentially the same as the non-repetitive pattern of the notice chip;

determining a true defect of the object, which includes a defect smaller than 0.3 μm in size, based upon at least one of the comparing steps; and outputting information relating to a result of the determining step.

11. A method according to claim 10, wherein the determining step includes the steps of extracting defect candidates of the repetitive pattern of said notice point, based on differences between the image signals of the repetitive pattern of said notice point and the image signals of the repetitive pattern of said reference point; comparing the defect candidates thus extracted with a threshold to extract all false defects; and excluding the false defects thus extracted from the defect candidates to determine the true defect.

12. A method according to claim 10, wherein any defect that appears regularly for a plurality of said pattern groups is excluded as a false defect.

13. A method of inspecting a pattern formed in a semiconductor wafer, comprising the following steps:

adjusting a focal position of a focused electron beam by using an output of a height detection sensor which detects a height of a semiconductor wafer, on which a plurality of chips are formed;

imaging a pattern in the semiconductor wafer by scanning the focused electron beam having a diameter of 0.02 to 0.2 μm on the object and detecting electrons emanated from the object by the scanning, wherein the pattern on one of said chips includes a memory mat portion and a direct peripheral circuit repeatedly formed at a predetermined pitch;

converting an image signal obtained by the imaging step into digital image signals;

comparing digital image signals of a notice point of the memory mat portion of the chip to be inspected with digital image signals of a reference point of the memory mat portion corresponding to the notice point;

comparing digital image signals of a notice point of a direct peripheral circuit in a chip to be inspected with digital image signals of a reference point of a direct peripheral circuit in another chip which is essentially the same as the direct peripheral circuit of the notice point;

determining defect candidates in the pattern;

extracting false defects from the defect candidates thus determined;

determining a true defect, which includes a defect smaller than 0.3 µm in size; and outputting information relating to the true defect.

14. A method according to claim 3, wherein a defect that appears regularly on the semiconductor wafer is extracted as a false defect.

15. A pattern inspection method according to claim 13, wherein the step of determining a true defect includes the steps of extracting feature quantities of the defect candidates; and detecting a true defect based on the feature quantities of the defect candidates.

16. A pattern inspection method according to claim 13, wherein the step of determining a true defect includes the step of detecting, as the true defect, a defect candidate that occurs irregularly on the object to be inspected.

17. A pattern inspection method according to claim 16, wherein the step of comparing digital image signals of the notice point of the memory mat portion includes the step of storing, in a storage, the digital image signals of the reference point of the memory mat portion corresponding to the notice point.

* * * * *